US010929571B2

United States Patent
Pan et al.

(10) Patent No.: US 10,929,571 B2
(45) Date of Patent: Feb. 23, 2021

(54) FPGA HARDWARE-BASED SECURE COMPUTING METHOD AND APPARATUS

(71) Applicant: Advanced New Technologies Co., Ltd., Grand Cayman (KY)

(72) Inventors: Guozhen Pan, Hangzhou (CN); Yichen Tu, Hangzhou (CN); Ni Zhou, Hangzhou (CN); Jianguo Xu, Hangzhou (CN); Yongchao Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/742,441

(22) Filed: Jan. 14, 2020

(65) Prior Publication Data

US 2020/0226296 A1    Jul. 16, 2020

(30) Foreign Application Priority Data

Jan. 15, 2019    (CN) .......................... 201910037318.X

(51) Int. Cl.
*G06F 21/76*    (2013.01)
*H04L 9/06*    (2006.01)

(52) U.S. Cl.
CPC ............ *G06F 21/76* (2013.01); *H04L 9/0618* (2013.01)

(58) Field of Classification Search
CPC ...... G06F 21/76; G06F 21/79; G06F 12/1408; G06F 12/16; G06F 30/34; G06F 15/7871;

(Continued)

(56) References Cited

U.S. PATENT DOCUMENTS

2006/0059574 A1    3/2006    Fayad et al.
2013/0145431 A1    6/2013    Kruglick
(Continued)

FOREIGN PATENT DOCUMENTS

CN    101106449    1/2008
CN    102063593    5/2011
(Continued)

OTHER PUBLICATIONS

PCT International Search Report and Written Opinion in International Appln. No. PCT/US2020/013383, dated Mar. 18, 2020, 15 pages.

(Continued)

*Primary Examiner* — Brian F Shaw
(74) *Attorney, Agent, or Firm* — Fish & Richardson P.C.

(57) ABSTRACT

An FPGA hardware device obtains encrypted data of each participant of a secure computing system, where the FPGA hardware device stores at least one first key, where the at least one first key is at least one first key of all participants in the secure computing system or at least one first key of a predetermined number of trusted managers in the secure computing system, where the FPGA hardware device includes an FPGA chip. The FPGA hardware device decrypts the encrypted data of each participant by using a working key of each participant, to obtain plaintext data of each participant, where the working key of each participant is obtained based on a corresponding first key of the at least one first key. The FPGA hardware device performs computing based on the plaintext data of each participant to obtain a computing result. The FPGA hardware device outputs the computing result.

20 Claims, 20 Drawing Sheets

(58) Field of Classification Search
CPC ....... G06F 2211/007; G06F 2211/2107; G06F 3/0623; H04L 9/0822
See application file for complete search history.

(56) References Cited

U.S. PATENT DOCUMENTS

2013/0346759 A1  12/2013  LaMacchia et al.
2018/0157867 A1   6/2018  Woodall

FOREIGN PATENT DOCUMENTS

| CN | 102567671 | 7/2012 |
| CN | 103023647 | 4/2013 |
| CN | 108418680 | 8/2018 |
| CN | 108632240 | 10/2018 |
| CN | 108768636 | 11/2018 |
| TW | 201419031 | 5/2014 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Cui, "Research on FPGA Firmware Upgrade Encryption Technology," China Master's Theses Full-text Database Information Technology, Dec. 15, 2011, 12:135-396 (with English abstract).

FPGA HARDWARE-BASED SECURE COMPUTING METHOD AND APPARATUS

CROSS-REFERENCE TO RELATED APPLICATIONS

This application claims priority to Chinese Patent Application No. 201910037318.X, filed on Jan. 15, 2019, which is hereby incorporated by reference in its entirety.

TECHNICAL FIELD

Implementations of the present specification relate to a method for processing data, and more specifically, to a method and an apparatus for initializing FPGA hardware, a method and an apparatus for updating FPGA hardware, and a method and an apparatus for processing data based on FPGA hardware.

BACKGROUND

With development of new technologies such as big data and artificial intelligence, data privacy protection becomes more important due to increasing demands for multi-party data merging. For example, when data of a first party needs to be transmitted to a server of a second party to train a computing model with data of the second party, the first party may be concerned about whether the data of the first party is being stored by the second party for another purpose. The SGX technology is a technology developed to satisfy this demand. In this technology, user data of all parties is encircled in an "enclave" in a CPU to ensure that the data is not stolen by a hacker program operating at a hardware level, and an authentication mechanism is provided to prevent any party from stealing data of another party. However, security and credibility of this mechanism require putting trust in the chip manufacturer.

Therefore, a more effective secure computing solution is needed, to ensure security of data of all parties.

SUMMARY

Implementations of the present specification are intended to provide a more effective secure computing solution, to overcome disadvantages of the existing technology.

To implement the previous objective, an aspect of the present specification provides a method for initializing FPGA hardware for secure computing, where the FPGA hardware includes an FPGA chip and a first storage device connected to the FPGA chip, the first storage device is a nonvolatile storage, the FPGA chip is configured based on a configuration file currently stored in the first storage device, and the method is executed at the FPGA hardware and includes: obtaining a first-version configuration file stored in the first storage device, where the first-version configuration file includes at least one initial key and the first-version configuration file includes predetermined running logic jointly determined by at least one key owner of the at least one initial key, and the at least one initial key is at least one initial key of all participants in the secure computing system or the at least one initial key is at least one initial key of a predetermined number of trusted managers in the secure computing system, and reconfiguring the FPGA chip based on the first-version configuration file.

In an implementation, the FPGA hardware device is connected to a server by using a PCIE bus, and the obtaining a first-version configuration file stored in the first storage device includes: obtaining the first-version configuration file that is written into the first storage device by the server by using the PCIE bus.

In an implementation, the first-version configuration file is generated and provided under joint surveillance of the at least one key owner on the scene that the FPGA hardware device is located on, so that an initial key of any party included in the first-version configuration file is only visible to the party and the first-version configuration file cannot be tampered with.

Another aspect of the present specification provides a method for initializing an FPGA hardware device for secure computing, where the FPGA hardware device includes an FPGA chip and a first storage device connected to the FPGA chip, the first storage device is a nonvolatile storage device, the FPGA chip is configured based on a configuration file currently stored in the first storage device, the FPGA chip includes a fuse storage device, the fuse storage device pre-stores at least one first key, the at least one first key is at least one first key of all participants in the secure computing system or the at least one first key is at least one first key of a predetermined number of trusted managers in the secure computing system, and the method is executed at the FPGA hardware device and includes: obtaining a first-version configuration file stored in the first storage device, where the first-version configuration file includes predetermined running logic jointly determined by at least one key owner of the at least one first key, and reconfiguring the FPGA chip based on the first-version configuration file.

In an implementation, the trusted manager is a participant in the secure computing system.

Another aspect of the present specification provides a method for updating an FPGA hardware device used for secure computing, where the FPGA hardware device stores at least one first key, the at least one first key is at least one first key of all participants in the secure computing system or the at least one first key is at least one first key of a predetermined number of trusted managers in the secure computing system, the FPGA hardware device includes an FPGA chip and a first storage device connected to the FPGA chip, the first storage device is a nonvolatile storage device, the first storage device stores a first configuration file, the first configuration file includes first running logic jointly determined by at least one key owner of the at least one first key, the FPGA chip is currently configured based on the first configuration file, and the method is executed at the FPGA hardware device and includes: obtaining an encrypted file, where the encrypted file is obtained by performing encryption in a first predetermined sequence by at least one party of the at least one key owner, an encryption object of a first time of encryption includes a second configuration file, and the second configuration file includes second running logic jointly determined by the at least one key owner of the at least one first key, decrypting the encrypted file in a second predetermined sequence by using at least one working key of the at least one party, to obtain the second configuration file and store the second configuration file in the first storage device, where the second predetermined sequence corresponds to the first predetermined sequence, and the working key is obtained based on a first key of a corresponding party, and reconfiguring the FPGA chip based on the second configuration file.

In an implementation, the first time of encryption is completed under joint surveillance of the at least one key owner of the at least one first key, to ensure that the second configuration file is not tampered with.

In an implementation, the encryption object of the first time of encryption further includes a hash value of code of the second configuration file, the decrypting the encrypted file in a second predetermined sequence by using at least one working key of the at least one party, to obtain the second configuration file includes: decrypting the encrypted file in the second predetermined sequence by using the at least one working key of the at least one party, to obtain the second configuration file and the hash value of the code of the second configuration file, and the method further includes: verifying the second configuration file by using the hash value of the code after obtaining the second configuration file and the hash value of the code of the second configuration file.

In an implementation, the working key is a first key of a corresponding party.

In an implementation, the at least one party includes a first party, and the FPGA hardware device obtains a working key of the first party based on the following steps: obtaining an encrypted working key of the first party, and decrypting the encrypted working key by using a first key of the first party, to obtain the working key of the first party.

In an implementation, the working key is erased when the FPGA hardware device is powered off.

In an implementation, the working key is periodically updated.

In an implementation, the FPGA chip further includes a fuse storage device, and each first key is stored in the fuse storage device.

In an implementation, each first key is stored in the first storage device.

In an implementation, an encryption object of the encrypted file further includes at least one second key of the at least one key owner of the at least one first key, the decrypting the encrypted file in a second predetermined sequence by using at least one working key of the at least one party includes: decrypting the encrypted file in the second predetermined sequence by using the at least one working key of the at least one party, to obtain the second configuration file, and obtain a second key of a corresponding key owner at each time of decryption, and the method further includes: storing the second key in the first storage device as an updated first key of the corresponding key owner after obtaining the second key of the corresponding key owner at each time of decryption.

In an implementation, the FPGA chip has its own hardware key, and the storing the second key in the first storage device includes: encrypting the second key by using the FPGA chip by using its own hardware key, and storing an encrypted second key in the first storage device.

In an implementation, the first key is an initial key included in the first configuration file stored in the first storage device, the first configuration file is used to initialize the FPGA hardware device for secure computing, and the first key is stored in a logic circuit of the FPGA chip by using the first configuration file.

Another aspect of the present specification provides a method for processing data based on an FPGA hardware device, where the FPGA hardware device is used for secure computing, the FPGA hardware device stores at least one first key, the at least one first key is at least one first key of all participants in the secure computing system or the at least one first key is at least one first key of a predetermined number of trusted managers in the secure computing system, the FPGA hardware device includes an FPGA chip, the FPGA chip is configured based on running logic jointly determined by at least one key owner of the at least one first key, and the method is executed at the FPGA hardware device and includes: obtaining encrypted data of each participant, decrypting the corresponding encrypted data by using a working key of each participant, to obtain plaintext data of each party, where the working key of each participant is obtained based on a corresponding first key of the at least one first key, performing computing based on the plaintext data of each party to obtain a computing result, and outputting the computing result.

In an implementation, the encrypted data is obtained through symmetric encryption, all the participants include a first party, and the outputting the computing result includes: encrypting the computing result by using a working key of the first party, to obtain a first encryption result, and outputting the first encryption result to the first party.

In an implementation, the encrypted data is obtained through asymmetric encryption, the working key is a decryption key of the asymmetric encryption, the asymmetric encryption further includes an encryption key corresponding to the working key, all the participants include a first party, an encryption key of the first party is obtained based on a first key corresponding to the first party, and the outputting the computing result includes: encrypting the computing result by using the encryption key of the first party, to obtain a first encryption result, and outputting the first encryption result to the first party.

In an implementation, the at least one first key is the at least one first key of all the participants in the secure computing system, the FPGA hardware device further stores respective second keys of all the participants, the encrypted data is obtained through asymmetric encryption, all the participants include a first party, a working key of the first party is a first key of the first party, a second key of the first party is an encryption key corresponding to the first key of the first party, and the outputting the computing result includes: encrypting the computing result by using the second key of the first party, to obtain a first encryption result, and outputting the first encryption result to the first party.

In an implementation, the at least one first key is the at least one first key of the predetermined number of trusted managers in the secure computing system, all the participants include a first party, the predetermined number of trusted managers include a first manager, the first manager corresponds to the first party, and the FPGA hardware device obtains a working key of the first party based on the following steps: obtaining an encrypted working key of the first party, where the encrypted working key is generated after the first manager encrypts the working key of the first party by using a first key of the first manager, and the working key of the first party is received by the first manager from the first party, and decrypting the encrypted working key by using the first key of the first manager, to obtain the working key of the first party.

Another aspect of the present specification provides an apparatus for initializing an FPGA hardware device for secure computing, where the FPGA hardware device includes an FPGA chip and a first storage device connected to the FPGA chip, the first storage device is a nonvolatile storage device, the FPGA chip is configured based on a configuration file currently stored in the first storage device, and the apparatus is deployed at the FPGA hardware device and includes: an acquisition unit, configured to obtain a first-version configuration file stored in the first storage device, where the first-version configuration file includes at least one initial key and the first-version configuration file includes predetermined running logic jointly determined by at least one key owner of the at least one initial key, and the at least one initial key is at least one initial key of all participants in the secure computing system or the at least one initial key is at least one initial key of a predetermined number of trusted managers in the secure computing system, and a configuration unit, configured to reconfigure the FPGA chip based on the first-version configuration file.

In an implementation, the FPGA hardware device is connected to a server by using a PCIE bus, and the acquisition unit is further configured to obtain the first-version configuration file that is written into the first storage device by the server by using the PCIE bus.

In an implementation, the first-version configuration file is generated and provided under joint surveillance of the at least one key owner on the scene that the FPGA hardware device is located on, so that an initial key of any party included in the first-version configuration file is only visible to the party and the first-version configuration file cannot be tampered with.

Another aspect of the present specification provides an apparatus for initializing an FPGA hardware device for secure computing, where the FPGA hardware device includes an FPGA chip and a first storage device connected to the FPGA chip, the first storage device is a nonvolatile storage device, the FPGA chip is configured based on a configuration file currently stored in the first storage device, the FPGA chip includes a fuse storage device, the fuse storage device pre-stores at least one first key, the at least one first key is at least one first key of all participants in the secure computing system or the at least one first key is at least one first key of a predetermined number of trusted managers in the secure computing system, and the apparatus is deployed at the FPGA hardware device and includes: an acquisition unit, configured to obtain a first-version configuration file stored in the first storage device, where the first-version configuration file includes predetermined running logic jointly determined by at least one key owner of the at least one first key, and a configuration unit, configured to reconfigure the FPGA chip based on the first-version configuration file.

In an implementation, the trusted manager is a participant in the secure computing system.

Another aspect of the present specification provides an apparatus for updating an FPGA hardware device used for secure computing, where the FPGA hardware device stores at least one first key, the at least one first key is at least one first key of all participants in the secure computing system or the at least one first key is at least one first key of a predetermined number of trusted managers in the secure computing system, the FPGA hardware device includes an FPGA chip and a first storage device connected to the FPGA chip, the first storage device is a nonvolatile storage device, the first storage device stores a first configuration file, the first configuration file includes first running logic jointly determined by at least one key owner of the at least one first key, the FPGA chip is currently configured based on the first configuration file, the FPGA hardware device stores the at least one first key of all the participants, and the apparatus is deployed at the FPGA hardware device and includes: an acquisition unit, configured to obtain an encrypted file, where the encrypted file is obtained by performing encryption in a first predetermined sequence by at least one party of the at least one key owner, an encryption object of a first time of encryption includes a second configuration file, and the second configuration file includes second running logic jointly determined by the at least one key owner of the at least one first key, a decryption unit, configured to decrypt the encrypted file in a second predetermined sequence by using at least one working key of the at least one party, to obtain the second configuration file and store the second configuration file in the first storage device, where the second predetermined sequence corresponds to the first predetermined sequence, and the working key is obtained based on a first key of a corresponding party, and a configuration unit, configured to reconfigure the FPGA chip based on the second configuration file.

In an implementation, the first time of encryption is completed under joint surveillance of the at least one key owner of the at least one first key, to ensure that the second configuration file is not tampered with.

In an implementation, the encryption object of the first time of encryption further includes a hash value of code of the second configuration file, the decryption unit is further configured to decrypt the encrypted file in the second predetermined sequence by using the at least one working key of the at least one party, to obtain the second configuration file and the hash value of the code of the second configuration file, and the apparatus further includes: a verification unit, configured to verify the second configuration file by using the hash value of the code after the second configuration file and the hash value of the code of the second configuration file are obtained.

In an implementation, the working key is a first key of a corresponding party.

In an implementation, the at least one party includes a first party, the FPGA hardware device obtains a working key of the first party based on a key negotiation apparatus, and the key negotiation apparatus includes: an acquisition unit, configured to obtain an encrypted working key of the first party, and a decryption unit, configured to decrypt the encrypted working key by using a first key of the first party, to obtain the working key of the first party.

In an implementation, the working key is erased when the FPGA hardware device is powered off.

In an implementation, the working key is periodically updated.

In an implementation, the FPGA chip further includes a fuse storage device, and each first key is stored in the fuse storage device.

In an implementation, each first key is stored in the first storage device.

In an implementation, an encryption object of the encrypted file further includes at least one second key of the at least one key owner of the at least one first key, the decryption unit is further configured to decrypt the encrypted file in the second predetermined sequence by using the at least one working key of the at least one party, to obtain the second configuration file, and obtain a second key of a corresponding key owner at each time of decryption, and the apparatus further includes: a storage unit, configured to store the second key in the first storage device as an updated first key of the corresponding key owner after the second key of the corresponding key owner is obtained at each time of decryption.

In an implementation, the FPGA chip has its own hardware key, and the storage unit includes: an encryption subunit, configured to encrypt the second key by using the FPGA chip by using its own hardware key, and a storage subunit, configured to store an encrypted second key in the first storage device.

In an implementation, the first key is an initial key included in the first configuration file stored in the first storage device, the first configuration file is used to initialize the FPGA hardware device for the secure computing, and the first key is stored in a logic circuit of the FPGA chip by using the first configuration file.

Another aspect of the present specification provides an apparatus for processing data based on an FPGA hardware device, where the FPGA hardware device is used for secure computing, the FPGA hardware device stores at least one first key, the at least one first key is at least one first key of all participants in the secure computing or the at least one first key is at least one first key of a predetermined number of trusted managers in the secure computing, the FPGA hardware device includes an FPGA chip, the FPGA chip is configured based on running logic jointly determined by at least one key owner of the at least one first key, and the apparatus is deployed at the FPGA hardware device and includes: an acquisition unit, configured to obtain encrypted data of each participant, a decryption unit, configured to decrypt the corresponding encrypted data by using a working key of each participant, to obtain plaintext data of each party, where the working key of each participant is obtained based on a corresponding first key of the at least one first key, a computing unit, configured to perform computing based on the plaintext data of each party to obtain a computing result, and an output unit, configured to output the computing result.

In an implementation, the encrypted data is obtained through symmetric encryption, all the participants include a first party, and the output unit includes: an encryption subunit, configured to encrypt the computing result by using a working key of the first party, to obtain a first encryption result, and an output subunit, configured to output the first encryption result to the first party.

In an implementation, the encrypted data is obtained through asymmetric encryption, the working key is a decryption key of the asymmetric encryption, the asymmetric encryption further includes an encryption key corresponding to the working key, all the participants include a first party, an encryption key of the first party is obtained based on a first key corresponding to the first party, and the output unit includes: an encryption subunit, configured to encrypt the computing result by using the encryption key of the first party, to obtain a first encryption result, and an output subunit, configured to output the first encryption result to the first party.

In an implementation, the at least one first key is the at least one first key of all the participants in the secure computing system, the FPGA hardware device further stores respective second keys of all the participants, the encrypted data is obtained through asymmetric encryption, all the participants include a first party, a working key of the first party is a first key of the first party, a second key of the first party is an encryption key corresponding to the first key of the first party, and the output unit includes: an encryption subunit, configured to encrypt the computing result by using the second key of the first party, to obtain a first encryption result, and an output subunit, configured to output the first encryption result to the first party.

In an implementation, the at least one first key is the at least one first key of the predetermined number of trusted managers in the secure computing system, all the participants include a first party, the predetermined number of trusted managers include a first manager, the FPGA hardware device obtains a working key of the first party by using a key negotiation apparatus, the first manager corresponds to the first party, and the key negotiation apparatus includes: an acquisition unit, configured to obtain an encrypted working key of the first party, where the encrypted working key is generated after the first manager encrypts the working key of the first party by using a first key of the first manager, and the working key of the first party is received by the first manager from the first party, and a decryption unit, configured to decrypt the encrypted working key by using the first key of the first manager, to obtain the working key of the first party.

Another aspect of the present specification provides a computer readable storage medium, where the computer readable storage medium stores a computer program, and when the computer program is executed in a computer, the computer is enabled to perform any one of the previous methods.

Another aspect of the present specification provides a computing device, including a storage device and a processor, where the storage device stores executable code, and when executing the executable code, the processor implements any one of the previous methods.

According to the FPGA hardware-based secure computing solution in the implementations of the present specification, security and update flexibility of secure computing systems are improved, and more conveniences are provided for participants in the secure computing system.

BRIEF DESCRIPTION OF DRAWINGS

The implementations of the present specification are described with reference to the accompanying drawings, so that the implementations of the present specification can be described clearer.

DESCRIPTION OF IMPLEMENTATIONS

The following describes the implementations of the present specification with reference to the accompanying drawings.

Figure 1:
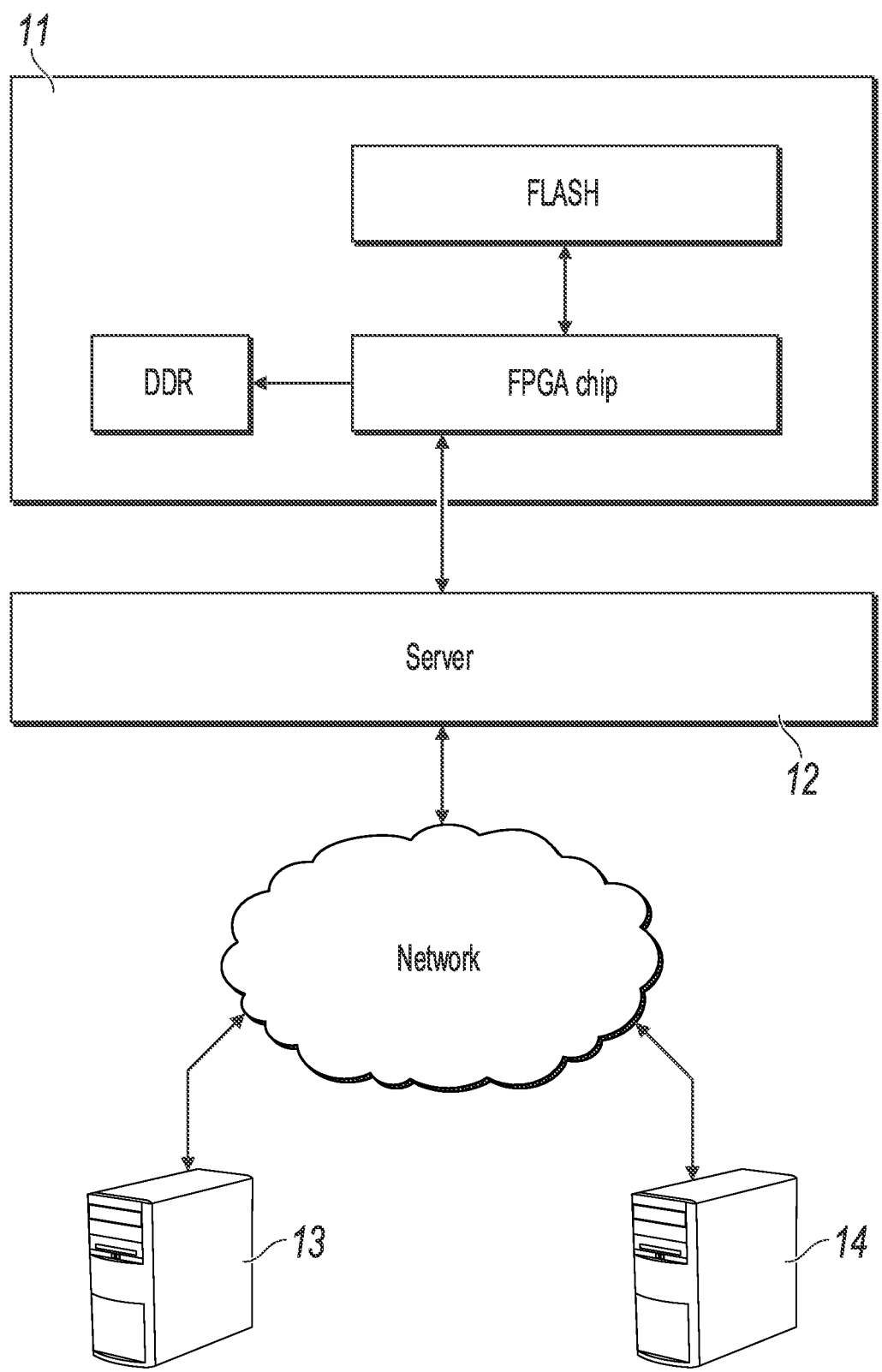
FIG. 1 is a schematic diagram illustrating a scenario of multi-party secure computing system, according to an implementation of the present specification.

FIG. 1 is a schematic diagram illustrating a scenario of a multi-party secure computing system, according to an implementation of the present specification. As shown in the figure, this scenario includes an FPGA hardware device 11, a server 12, a first party 13, and a second party 14. The FPGA hardware device 11 is connected to the server 12 by using, for example, a PCIE bus. The first party 13 and the second party 14 are participants in the multi-party secure computing system. The FPGA hardware device 11 includes an FPGA chip, a first storage device (FLASH in the figure), and a second storage device (DDR in the figure). The first storage device is a nonvolatile storage, for example, a flash, and the second storage device is a memory, for example, a DDR memory. It can be understood that, although only two participants in the multi-party secure computing system are shown in the figure, this implementation of the present specification is not limited thereto. The multi-party secure computing system can include at least one participant, for example, can include one participant, or can include at least two participants. In addition, descriptions such as "first" and "second" in the present specification are merely used for distinguishing between similar concepts for ease of description, and are not used for limitation.

First party 13 and second party 14 build respective keys in the FPGA hardware device in a secure way, so that a key of each party is only visible to the party and is not disclosed to the other party in this process. In addition, first party 13 and second party 14 store a plaintext first-version configuration file (for example, a bit file) jointly formulated by first party 13 and second party 14 in the FLASH, to configure the FPGA chip, and enable the first-version configuration file to be not tampered with in this process. After the first-version bit file is deployed as described above, first party 13 and second party 14 can remotely transfer an encrypted new-version bit file to server 12, and server 12 stores the encrypted new-version bit file in the DDR in the FPGA hardware device. The encrypted new-version bit file is obtained by sequentially encrypting a new-version bit file by the first party and the second party, to ensure that the new-version bit file cannot be tampered with. After obtaining the encrypted new-version bit file, the FPGA chip can decrypt the encrypted new-version bit file based on running logic in the first-version bit file by using the previously built-in keys of the parties, to obtain the new-version bit file and store the new-version bit file in the FLASH. Therefore, the FPGA chip can be configured based on the new-version bit file, so that the FPGA chip can work based on running logic in the new-version bit file. In addition, first party 13 and second party 14 can add respective updated keys to the encrypted new-version bit file, to update the keys of the parties previously built in the FPGA hardware device.

The respective keys of the first party and the second party are previously built in the FPGA hardware device, so that the first party and the second party can transfer respective working keys to the FPGA hardware device based on the keys of the first party and the second party. For example, when the first party inputs data into the FPGA hardware device, the first party can encrypt the data of the first party by using a working key of the first party and then transfer encrypted data to the FPGA hardware device, and the FPGA hardware device can decrypt the encrypted data by using the previously obtained working key of the first party, to obtain plaintext data. The FPGA hardware device can obtain plaintext data of the second party in a similar way, and perform computing based on the data of the first party and the data of the second party, to ensure that data of each of the first party and the second party cannot be obtained by any party other than the party, thereby ensuring data security of the multi-party computing.

The following specifically describes the previous FPGA hardware-based secure computing solution.

Figure 2:
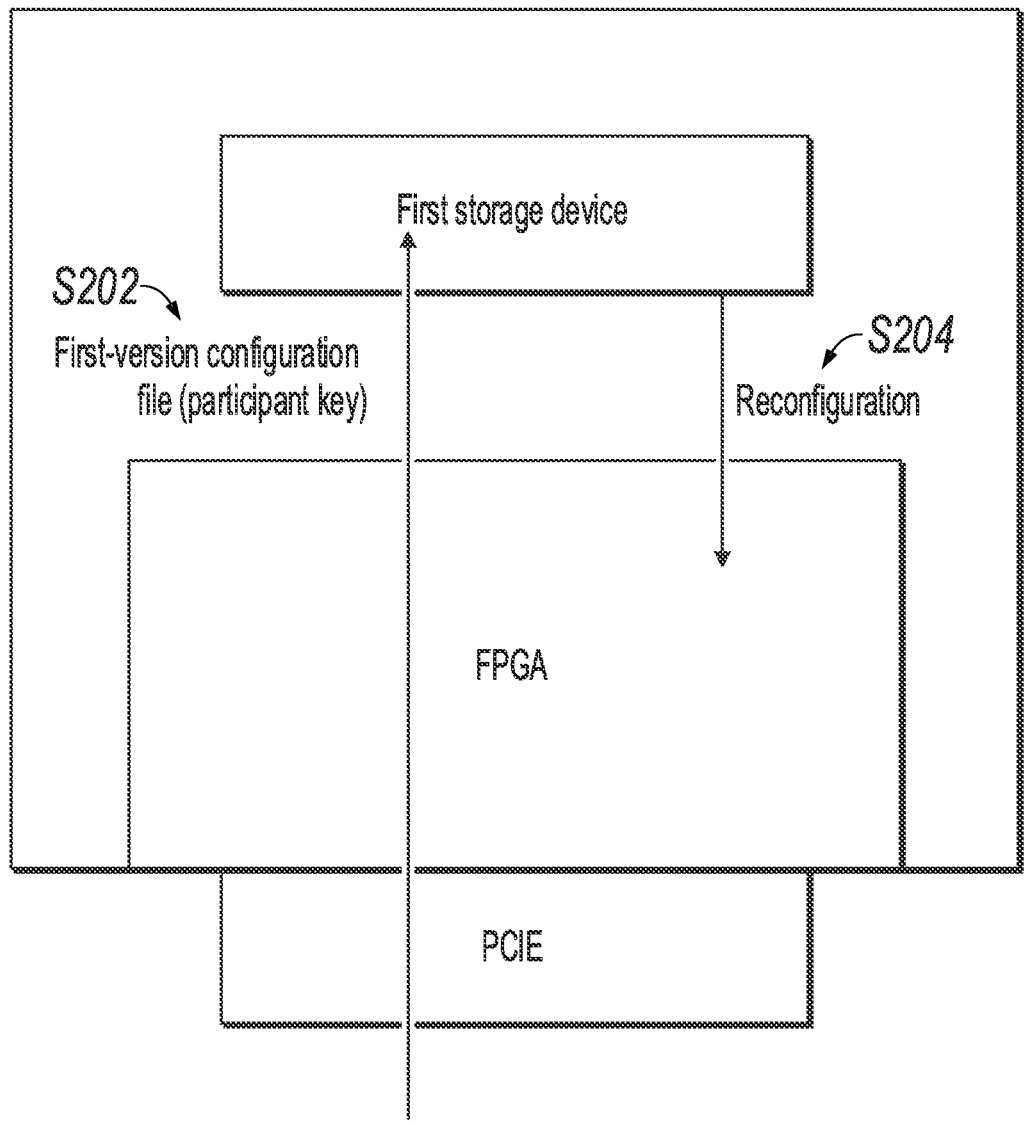
FIG. 2 illustrates a schematic process of initializing an FPGA hardware device for secure computing, according to an implementation of the present specification.

FIG. 2 illustrates a schematic process of initializing an FPGA hardware device for secure computing, according to an implementation of the present specification. The FPGA hardware device is, for example, the FPGA hardware device shown in FIG. 1, and includes an FPGA chip and a first storage device connected to the FPGA chip. The first storage device is a nonvolatile storage, for example, a flash storage device. Before the process shown in FIG. 2 is performed, the first storage device currently stores an initial configuration file, for example, an original bit file of the FPGA hardware device. The FPGA chip is currently configured based on running logic in the initial configuration file, that is, programmed based on the original bit file. It can be understood that the initial configuration file is not limited to the original bit file. For example, the initial configuration file can be another file that can be used to program the FPGA chip, for example, a bin file, or the initial configuration file can be an intermediate bit file that is not an original bit file, provided that the configuration file can enable the FPGA chip to currently provide a specific interface and a storage function implemented by using the interface. For example, as shown in FIG. 1, the FPGA hardware device is connected to a server by using a PCIE bus. It can be understood that the FPGA hardware device is not limited to being connected to the server by using the PCIE bus, and can be connected to the server by using another interface, for example, a network interface, provided that the FPGA hardware device can be configured by using a configuration file for the FPGA chip.

As shown in FIG. 2, in step S202, a first-version configuration file is obtained at the FPGA hardware device. For example, the server writes the first-version configuration file into the first storage device by using the PCIE bus. The first-version configuration file is a first-version bit file jointly formulated by all participants in the secure computing system. Because the original bit file does not include logic for decrypting a newly stored file, the first-version bit file can be stored in the first storage device only in a plaintext form. Therefore, in an implementation, the multiple participants in the secure computing system can jointly generate the bit file on the scene that the FPGA hardware device is located on, and jointly write the bit file into the first storage device, to ensure security of the first-version bit file. Specifically, any party in the multiple participants can first generate a programming program (for example, HDL code) of the first-version bit file based on predetermined running logic, and bring the programming program to the scene that the FPGA hardware device is located on. The predetermined running logic is jointly formulated by the multiple participants. On the scene, after separately verifying that the programming program is correct, the other parties in the multiple participants can provide respective key files for the programming program to invoke, so that the programming program includes an initial key of each participant, and the initial key is invisible to any party other than the key provider, thereby ensuring security of each initial key. Then, under joint surveillance of all the participants, the program including the initial key of each party can be converted into the first-version bit file by using software (for example, vivado software), and the first-version bit file can be stored in the first storage device in the FPGA hardware device by using the server connected to the FPGA hardware device, to ensure that the bit file is not modified by any party, and ensure that each initial key is not disclosed to any party other than the key provider.

The initial key can be a key used for symmetric encryption, that is, the key can be used for both decryption and encryption. Alternatively, the initial key can be a decryption key for asymmetric encryption. Alternatively, the initial key can include a decryption key and an encryption key for asymmetric encryption.

In an implementation, the first-version configuration file can be written by a trusted authority. For example, the authority is a server provider or a platform manager. Specifically, the multiple participants can provide the jointly determined programming program for the authority, and provide respective initial keys for the authority. Therefore, after adding the initial keys of all the parties to the programming program, the authority converts the programming program into the first-version bit file, and writes the first-version bit file into the first storage device in the FPGA hardware device by using the server.

In an implementation, the server connected to the FPGA hardware device is a trusted server. Therefore, the multiple participants can generate the first-version bit file in the server under joint surveillance of the multiple participants on the scene, and the server provides protection for a program, data, and a key in a process in which the multiple participants generate the first-version bit file, so that the first-version bit file can be safely stored in the first storage device, to ensure that the first-version bit file and the keys in the first-version bit file cannot be obtained by malware or a malicious person.

In an implementation, the server connected to the FPGA hardware device is an untrusted server. Therefore, the multiple participants can arrive at the scene and generate the first-version bit file on a trusted computer jointly determined by the multiple participants under joint surveillance of the multiple parties, and jointly write the generated first-version bit file into the first storage device by using the server, to ensure that the first-version bit file is not stored, transmitted, etc. for another purpose.

As described above, the programming program of the first-version bit file corresponds to the predetermined running logic used for the FPGA chip, and the predetermined running logic specifies a predetermined behavior of the FPGA chip in a predetermined case. For example, the predetermined running logic includes: providing a bit file update API and a data processing API for the server. The FPGA chip is limited to providing, for example, only the previous APIs, to prevent the server from accessing the FPGA hardware device in another way, thereby ensuring security of internal data of the FPGA hardware device. The predetermined running logic further includes interface logic for the FPGA chip. For example, an interface of the FPGA chip is programmed as a PCIE bus interface by using the interface logic. The predetermined running logic further includes bit file update logic. For example, after the server invokes the bit file update API and writes an encrypted bit file into the FPGA hardware device by using the PCIE bus, the FPGA chip can decrypt the encrypted bit file based on decryption logic in the bit file update logic, to obtain a bit file, and update the bit file based on the predetermined logic. The predetermined running logic further includes data processing logic, so that after all the participants in the secure computing system invoke the data processing API and input data to the FPGA hardware device by using the server, the FPGA hardware device performs computing based on the data and the predetermined data processing logic, to obtain a computing result.

In step S204, in the FPGA hardware device, the FPGA chip is reconfigured based on the first-version configuration file (first-version bit file) in the first storage device. That is, the FPGA chip is reprogrammed inside based on the programming program corresponding to the first-version bit file, so that the FPGA chip works based on the running logic corresponding to the first-version bit file. Because the first-version bit file includes the at least one initial key of all the participants, after the FPGA chip is reconfigured based on the first-version bit file, the initial keys included in the first-version bit file are written into a logic circuit of the FPGA chip, that is, stored in a register, a static random access storage device (SRAM), etc. in the FPGA chip.

Figure 3:
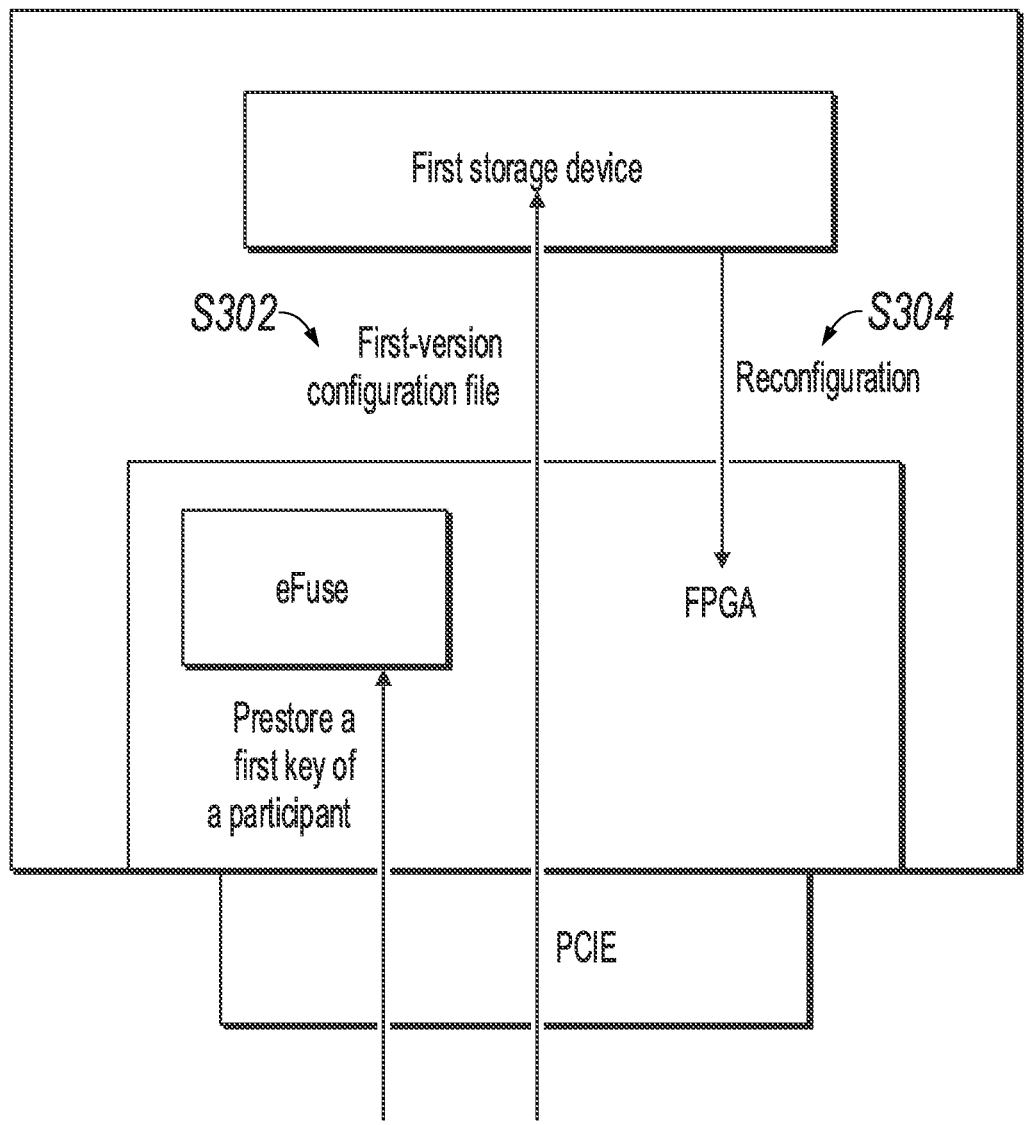
FIG. 3 illustrates a schematic process of initializing an FPGA hardware device, according to another implementation of the present specification.

FIG. 3 illustrates a schematic process of initializing an FPGA hardware device, according to another implementation of the present specification. Like the FPGA hardware device shown in FIG. 2, the FPGA hardware device also includes an FPGA chip and a first storage device connected to the chip, the first storage device is a nonvolatile storage device, the first storage device stores an initial configuration file, and the FPGA hardware device is configured currently (that is, before the method shown in FIG. 3 is implemented) based on running logic in the initial configuration file. In addition, the FPGA hardware device shown in FIG. 3 is also connected to a server by using, for example, a PCIE bus. Different from the FPGA hardware device shown in FIG. 2, in the FPGA hardware device shown in FIG. 3, the FPGA chip further includes a fuse storage device (eFuse), and the fuse storage device is a one-time programmable storage device.

As shown in FIG. 3, the eFuse pre-stores at least one first key of all participants in secure computing system. In an implementation, all the participants in the secure computing system can together arrive at the place that the FPGA hardware device is located at and jointly generate a bit file used to program the fuse storage device, to separately add the first keys of all the parties to the bit file, and enable the first key to be only visible to a provider of the first key and not disclosed to any party other than the key provider. In an implementation, the fuse storage device can be alternatively programed by using a trusted authority. For example, the trusted authority is a server provider, and all the participants in the secure computing system provide the respective first keys for the authority, to complete, by using the authority, a process of building the first keys in the FPGA chip. Because the fuse storage device can be programed only once, the first keys cannot be modified after being built in the FPGA chip, and the first keys can be used as root keys of all the participants. In an implementation, the first keys can be directly written into the fuse storage device by using, for example, a JTAG interface, and the JTAG interface is disabled after the writing, to ensure security of the FPGA hardware device.

In step S302, a first-version configuration file stored in the first storage device is obtained at the FPGA hardware device. For example, the server stores the first-version configuration file in the first storage device. The first-version configuration file is basically the same as the first-version configuration file shown in FIG. 2. A difference lies in that the first-version configuration file includes only predetermined running logic jointly formulated by all the participants, and does not include the keys of all the participants. The server can store a first-version bit file in the first storage device based on running logic in the bit file used to program the fuse storage device in the current FPGA chip. Likewise, because the first-version bit file is not an encrypted file, all the participants can arrive at the place that the FPGA hardware device is located at and perform joint surveillance, to write the first-version bit file into the first storage device, thereby ensuring that the first-version bit file is not tampered with.

In step S304, in the FPGA hardware device, the FPGA chip is reconfigured based on the first-version configuration file. That is, the FPGA chip is reprogrammed based on the first-version bit file, so that the FPGA chip works based on running logic in the first-version bit file. The running logic in the first-version bit file is similar to the running logic in the first-version bit file in FIG. 2, for example, includes interface logic, bit file update logic, and data processing logic.

Figure 4:
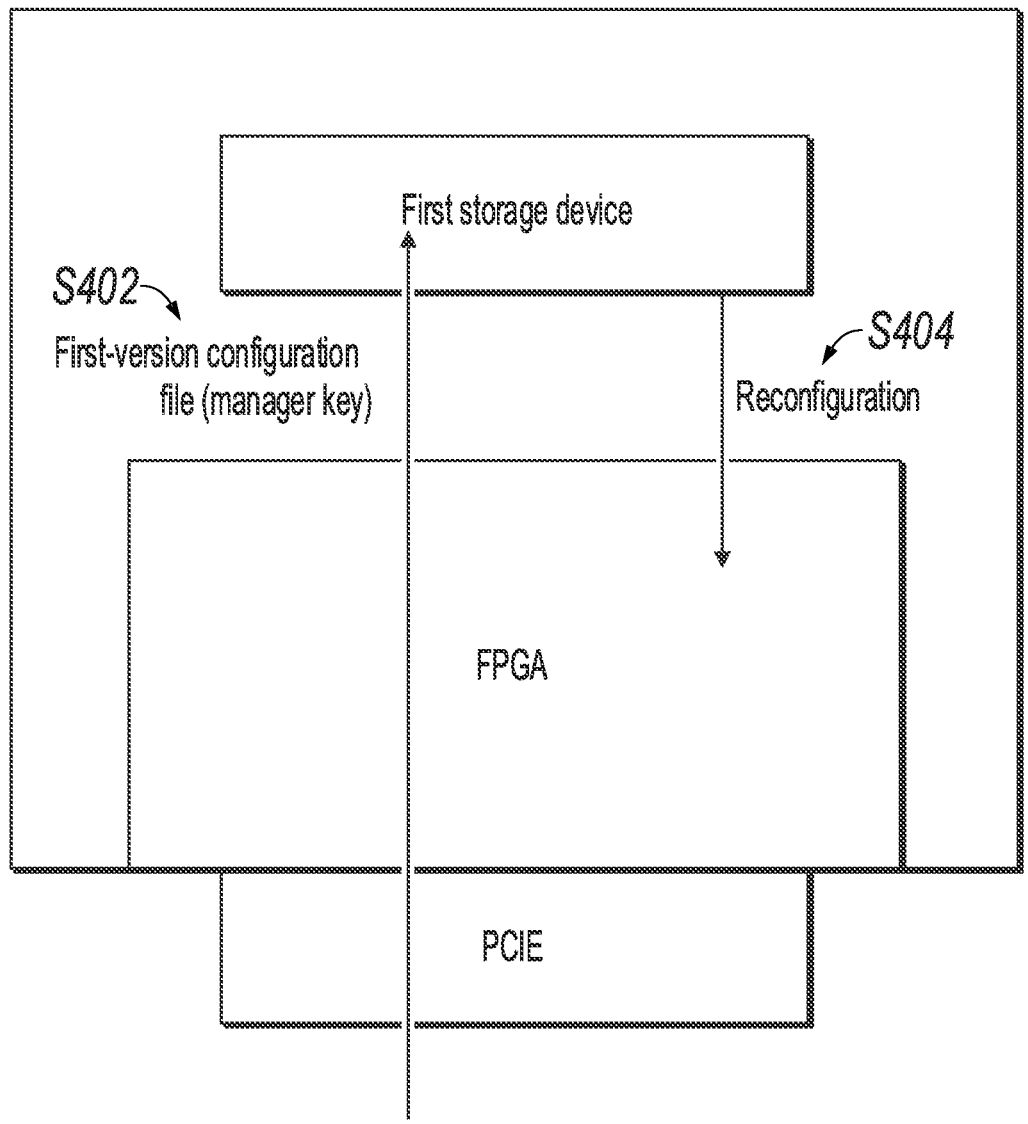
FIG. 4 is a schematic diagram illustrating a method for initializing an FPGA hardware device for secure computing, according to another implementation of the present specification.

FIG. 4 is a schematic diagram illustrating a method for initializing an FPGA hardware device for secure computing, according to another implementation of the present specification. The FPGA hardware device includes an FPGA chip and a first storage device connected to the FPGA chip, the first storage device is a nonvolatile storage device, the FPGA chip is configured based on a configuration file currently stored in the first storage device, and the method is executed at the FPGA hardware device and includes the following steps.

When there are a large number of participants in the secure computing system, the methods shown in FIG. 2 and FIG. 3 are difficult to operate, or are operated for excessively long time. In this case, respective keys of a predetermined number of trusted managers can be built in the FPGA hardware device by using an initialization method similar to the initialization method shown in FIG. 2. The trusted manager is, for example, an authoritative institution, a key management infrastructure (Key Management Infrastructure), or an authoritative service providing platform. For example, when the participants in the secure computing system include a participant that is an authoritative institution, the trusted manager may be one of the multiple participants in the secure computing system. When the keys of the trusted managers are built in the FPGA hardware device, the predetermined number of managers can determine a first-version bit file used for initialization and a subsequently updated bit file, and the FPGA hardware device can obtain working keys of all the participants by using the keys of the managers, for subsequent data processing.

Referring to FIG. 4, in step S402, a first-version configuration file stored in the first storage device is obtained, where the first-version configuration file includes at least one initial key of the predetermined number of trusted managers in the secure computing system, and the first-version configuration file includes predetermined running logic jointly determined by all the managers.

Different from the method shown in FIG. 2, in the method shown in FIG. 4, the first-version configuration file includes the initial keys of the trusted managers, and the running logic in the first-version configuration file is jointly determined by all the managers. One or more trusted managers can be predetermined based on a security demand. More trusted managers indicate higher security. The trusted manager can be, for example, an authoritative institution, such as a bank or a government department. The predetermined running logic can be provided by a third party and acknowledged by the trusted managers, or can be provided by the participants in the secure computing system and acknowledged by the trusted managers, or can be formulated by the trusted managers.

Similar to the method shown in FIG. 2, in the method shown in FIG. 4, when providing the at least one initial key in the first-version configuration file, all the managers can simultaneously arrive at the scene that the FPGA hardware device is located on and perform joint monitoring, so that a key of each manager is not obtained by any party other than the manager, and the first-version configuration file is not tampered with.

In step S404, the FPGA chip is reconfigured based on the first-version configuration file. This step is implemented similarly to the configuration steps in FIG. 2 and FIG. 3, and details are omitted here for simplicity.

Figure 5:
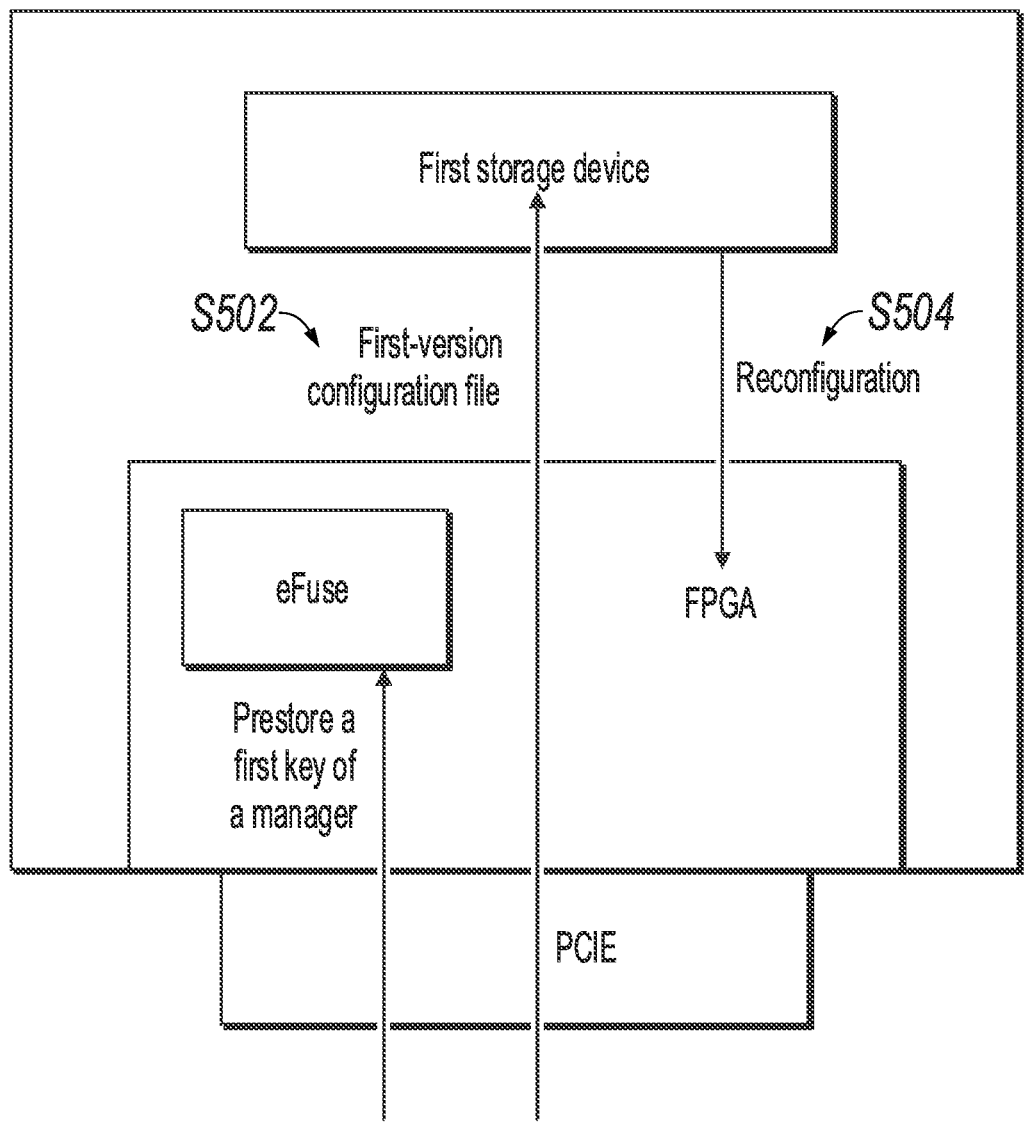
FIG. 5 is a schematic diagram illustrating a method for initializing an FPGA hardware device for secure computing, according to an implementation of the present specification.

FIG. 5 is a schematic diagram illustrating a method for initializing an FPGA hardware device for secure computing, according to an implementation of the present specification. The FPGA hardware device includes an FPGA chip and a first storage device connected to the FPGA chip, the first storage device is a nonvolatile storage device, the FPGA chip is configured based on a configuration file currently stored in the first storage device, the FPGA chip includes a fuse storage device, and the fuse storage device pre-stores at least one first key of a predetermined number of trusted managers in the secure computing system, and the method is executed at the FPGA hardware device and includes the following steps.

In step S502, a first-version configuration file stored in the first storage device is obtained, where the first-version configuration file includes predetermined running logic jointly determined by all the managers.

In step S504, the FPGA chip is reconfigured based on the first-version configuration file.

Except that keys built in the eFuse are the keys of all the managers, implementation of the steps in the method shown in FIG. 5 is basically the same as the implementation of the steps in FIG. 3, and details are omitted here for simplicity.

Figure 6:
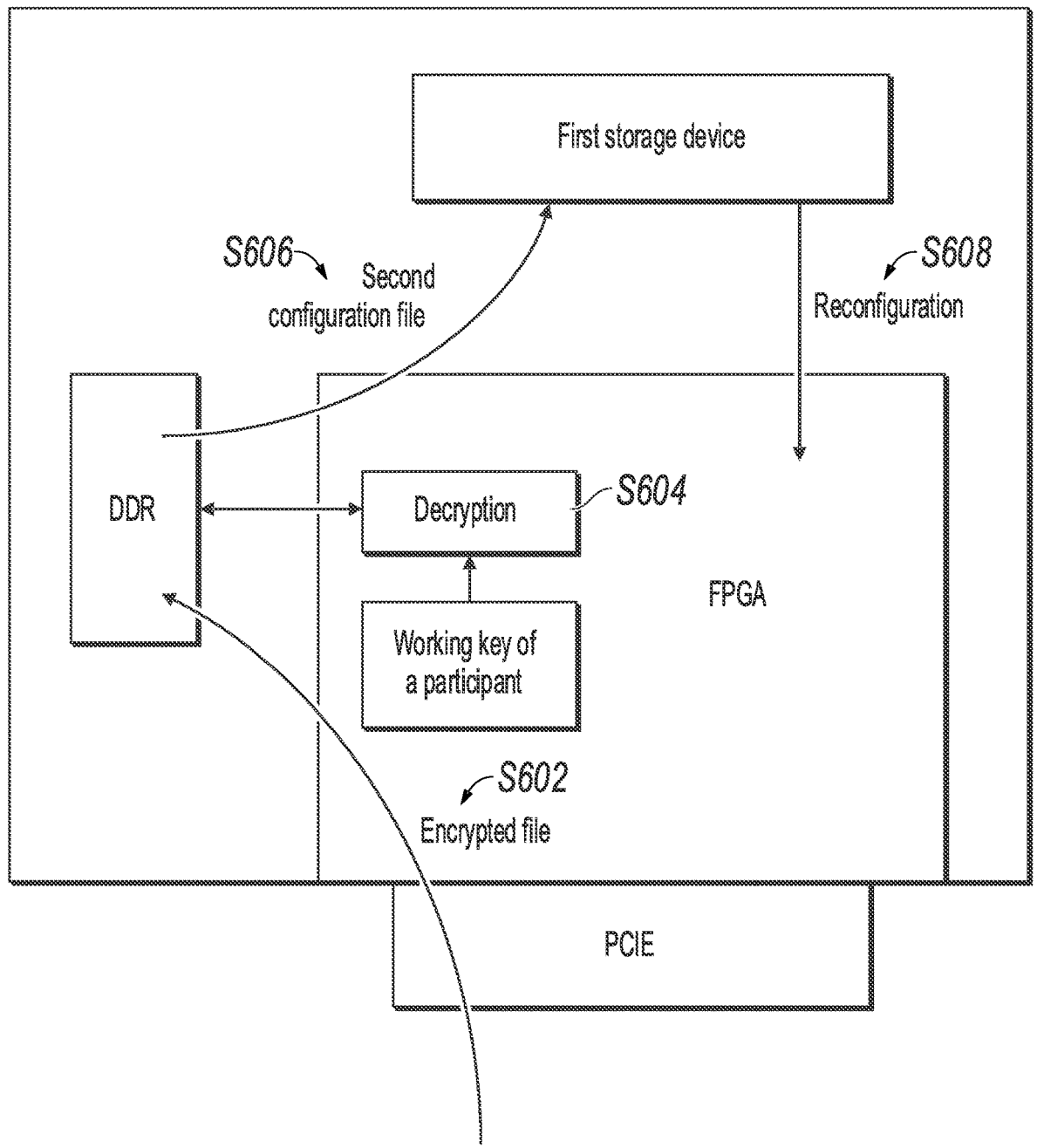
FIG. 6 illustrates a schematic process of updating an FPGA hardware device, according to an implementation of the present specification.

FIG. 6 illustrates a schematic process of updating an FPGA hardware device, according to an implementation of the present specification. This process is executed at the FPGA hardware device. Before the method shown in FIG. 6 is executed, the FPGA hardware device includes an FPGA chip used for secure computing and a first storage device connected to the FPGA chip, and the first storage device is a nonvolatile storage device. A configuration file is currently stored in the first storage device, and the currently stored configuration file can be represented as a first configuration file. The first configuration file includes first running logic jointly formulated by all participants, and the FPGA chip is currently configured based on the first running logic. For example, the first configuration file can be the first-version bit file shown in FIG. 2 or FIG. 3, or can be a bit file previously updated by using the method shown in FIG. 6. Any one of these first configuration files includes the running logic jointly formulated by all the participants. In the first running logic, for example, a configuration file update API is provided for a server, and after the server invokes the API, related configuration file update logic starts to be run in the FPGA chip, to start to execute the method shown in FIG. 6.

In addition, the hardware stores respective keys of all the participants in the secure computing system, and the keys of all the participants currently stored in the hardware can be represented as first keys. In an implementation, the first configuration file is the first-version bit file shown in FIG. 2. Therefore, the first-version bit file includes the first keys. In this case, the first-version bit file is programed into the FPGA chip, to write all the first keys into a logic circuit of the FPGA chip, that is, store the first keys in the logic circuit of the FPGA chip. In an implementation, the first configuration file is, for example, a bit file updated by using the method shown in FIG. 6. In this case, all the first keys can be stored in the first storage device. In an implementation, the first configuration file is, for example, the first-version bit file shown in FIG. 3. In this case, as described above, all the first keys are stored in a fuse storage device in the FPGA chip.

As shown in FIG. 6, in step S602, an encrypted file is obtained at the FPGA hardware device, that is, the encrypted file stored by the server in the FPGA hardware device is obtained at the FPGA hardware device. The encrypted file is obtained by performing encryption in a first predetermined sequence by at least one party of all the participants, an encryption object of a first time of encryption includes a second configuration file, and the second configuration file includes second running logic jointly formulated by all the participants.

In an implementation, all the participants encrypt the second configuration file in a predetermined sequence by using the respective keys of the participants, to obtain the encrypted file, and store the encrypted file in the FPGA hardware device by using the server. The predetermined sequence is determined in advance, and the first configuration file also includes decryption logic corresponding to the predetermined sequence. Similar to the first configuration file, the second configuration file also includes running logic jointly formulated by all the participants. Interface logic, configuration file update logic, etc. in the second configuration file can be the same as or similar to interface logic, configuration file update logic, etc. in the first configuration file. For example, the second configuration file includes updated data processing logic. For example, the data processing logic corresponds to a neural network model, and each participant may update a parameter of the neural network model based on a model training result. Therefore, the updated data processing logic corresponding to an updated model can be included in the second configuration file, to update a computing model in the FPGA hardware device. In an implementation, decryption logic for the encrypted file included in the configuration file update logic in the second configuration file can be set to be different from the decryption logic in the first configuration file.

All the participants can simultaneously arrive at the scene to perform the process as described above, or can remotely perform the process through video surveillance. For example, when party A in all the participants encrypts the second configuration file for the first time, party A first generates the second configuration file by using a corresponding programming program, and encrypts the second configuration file by using a key of party A. Because party A performs related processing on plaintext data, to prevent party A from tampering with the programming program or the second configuration file, the other participants in the secure computing system can perform joint video surveillance when party A performs the previous operation. For example, after all the participants jointly determine the corresponding programming program, each participant locally has the same programming program, and each participant can obtain a hash code value of the programming program, the second configuration file corresponding to the programming program, and a hash code value of the second configuration file. Before converting the programming program, party A can calculate the hash value of the code of the programming program by using software, and simultaneously the other participants jointly surveil the computing process through a video. After jointly determining, through video surveillance, that the hash value of the code is correct, party A converts the programming program into the second configuration file. Likewise, party A calculates the hash value of the code of the second configuration file, and the other participants jointly determine that the second configuration file is correct. After the previous confirmation process, under joint video surveillance of the other participants, party A encrypts the second configuration file by using encryption software and the key (for example, a first key) of party A, to obtain a file obtained by encrypting the second configuration file for the first time. Then, party A sends the encrypted file obtained through the first time of encryption to, for example, party B in the multiple participants, and party B encrypts the file obtained through the first time of encryption by using a key of party B, to obtain an encrypted file that is obtained by encrypting the second configuration file for two times. Then, party B sends the encrypted file obtained through the two times of encryption to, for example, party C in the participants, and party C performs the same operation as party B. The final encrypted file is obtained by performing one time of encryption by using its own key by each participant. For example, party E that performs the last time of encryption in the participants sends the encrypted file to the server, so that the server stores the encrypted file in the FPGA hardware device.

In an implementation, after calculating the hash code value of the second configuration file, under video surveillance of the other participants, party A packs and encrypts the second configuration file and the hash code value of the second configuration file, for subsequent verification of the FPGA hardware device on the second configuration file.

It can be understood that, although all the participants separately perform encryption to obtain the encrypted file as described above, this implementation of the present specification is not limited thereto. For example, only one party (for example, party A) that is agreed upon in all the participants can encrypt the second configuration file to obtain an encrypted file, and the party can send the encrypted file obtained through one time of encryption to the server. Alternatively, two or three parties in the participants can sequentially perform encryption. When the second configuration file is encrypted for a larger number of times, the second configuration file is more difficult to be cracked, so that security is higher.

Figure 7:
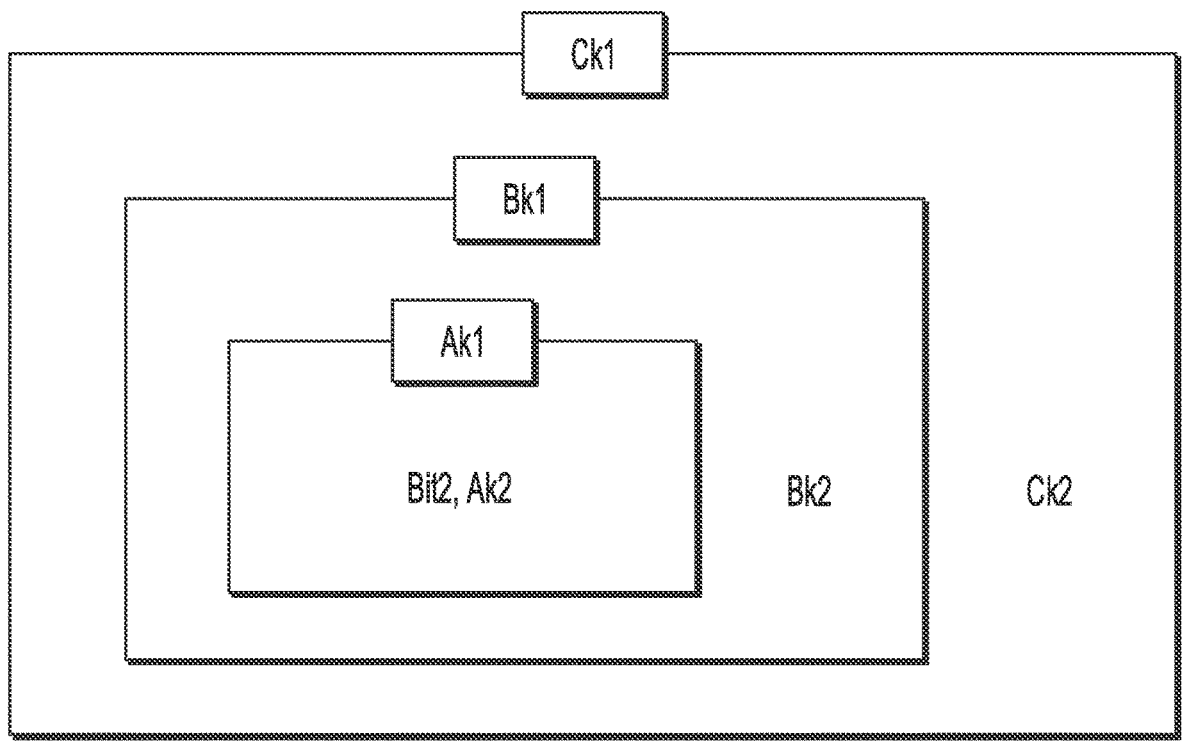
FIG. 7 is a schematic diagram illustrating an encrypted file that includes second keys of party A, party B, and party C.

In an implementation, the encrypted file is obtained by sequentially performing encryption by all the participants, and the encrypted file further includes updated keys (hereafter referred to as second keys) of all the participants. FIG. 7 is a schematic diagram illustrating an encrypted file that includes second keys of party A, party B, and party C. As shown in FIG. 7, for example, party A in the multiple participants can pack and encrypt the second configuration file (bit2) and a second key (Ak2) of party A by using, for example, a first key (Ak1) of party A or a current working key of party A, and send an encrypted file obtained through the first time of encryption to party B. Party B can pack and encrypt the encrypted file obtained through the first time of encryption and a second key (Bk2) of party B by using, for example, a first key (Bk1) of party B, to obtain an encrypted file obtained through the two times of encryption, and send the encrypted file obtained through the two times of encryption to party C. Similarly, party C packs and encrypts the received encrypted file and a second key (Ck2) of party C by using a first key (Ck1) of party C. A final encrypted file is obtained by similarly performing encryption by all the participants, and the final encrypted file includes the second keys of all the parties, for subsequent update of the first keys. In this process, party A can alternatively pack and encrypt the second configuration file, the hash code value of the second configuration file, and the second key of party A, and send an encrypted file to party B.

For example, the FPGA hardware device includes a second storage device connected to the FPGA chip. The second storage device is, for example, a DDR. In this case, the server can store the encrypted file in the DDR by using, for example, a PCIE bus. It can be understood that the encrypted file is not limited to being stored in the second storage device. For example, the encrypted file can be alternatively stored in the first storage device. In addition, the second storage device is not limited to the DDR, and can be any form of applicable storage device.

In step S604 in FIG. 6, in the FPGA hardware device, the encrypted file is decrypted in a second predetermined sequence based on current update logic in the FPGA chip by using at least one working key of the at least one party, to obtain the second configuration file. The second predetermined sequence corresponds to the first predetermined sequence, and the working key is obtained based on a first key of a corresponding party.

Current running logic in the FPGA chip is the first running logic included in the first configuration file, and the first running logic includes update logic used during configuration file updating. After the server invokes the configuration file update API, the FPGA chip works based on the update logic. The update logic includes logic for decrypting the encrypted file. For example, the logic includes decrypting the encrypted file in a predetermined sequence by using the at least one working key of the at least one party. The predetermined sequence corresponds to the sequence in which the at least one party sequentially encrypts the second configuration file. For example, if during encryption, party A, party B, and party C sequentially encrypt the second configuration file by using respective keys, the decryption logic corresponds to sequentially decrypting the encrypted file by using respective working keys of party C, party B, and party A, so that the second configuration file can be obtained.

In an implementation, a working key of each party is a first key of the party stored in the FPGA hardware device. For example, the encryption is symmetric encryption. For example, party A first performs encryption by using a first key of party A, then party B performs encryption by using a first key of party B, and then party C performs encryption by using a first key of party C. Therefore, after obtaining the encrypted file, the FPGA hardware device sequentially decrypts the encrypted file based on predetermined update logic by using the first key of party C, the first key of party B, and the first key of party A that are stored in the hardware, so that the second configuration file can be obtained. It can be understood that the encryption can be alternatively asymmetric encryption. In this case, party A, party B, and party C can perform encryption by using respective encryption keys corresponding to first keys of party A, party B, and party C, so that decryption is sequentially performed by using the corresponding first keys during decryption.

Figure 8:
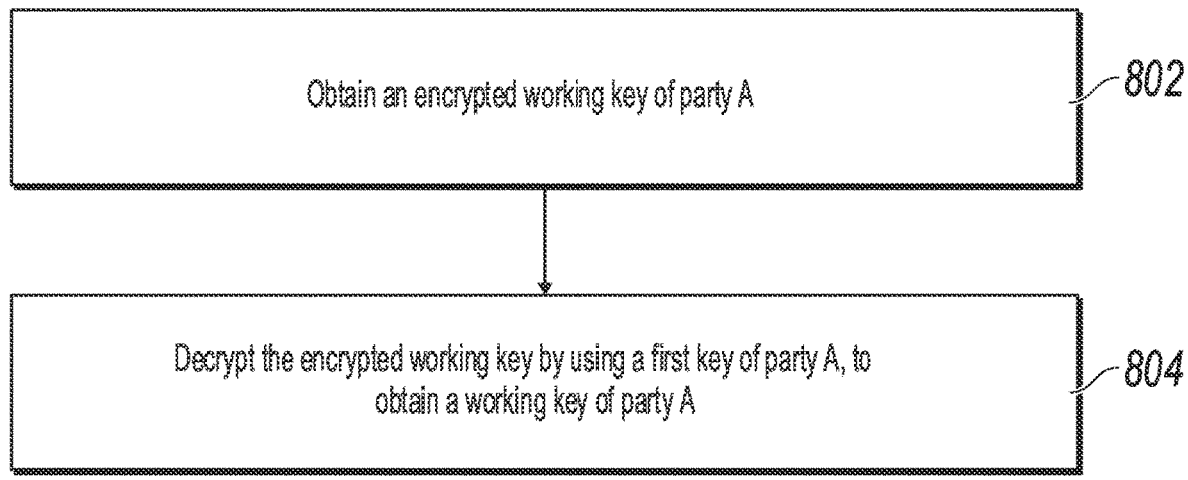
FIG. 8 illustrates a key negotiation process used by an FPGA hardware device to obtain a working key.

In an implementation, a working key of each party is additionally obtained based on a first key of the corresponding party. FIG. 8 illustrates a key negotiation process used by FPGA hardware device to obtain a working key. As shown in FIG. 8, the FPGA hardware device obtains a working key of party A in the multiple participants based on the following steps. In step S802, an encrypted working key of party A is obtained. For example, party A encrypts the working key of party A by using a first key of party A, and stores the encrypted working key in the FPGA hardware device, for example, in the DDR, by using the server, so that the FPGA hardware device obtains the encrypted working key of party A. In this case, the update logic for the FPGA chip further includes logic for obtaining a working key, so that in the FPGA chip, in step S804, the encrypted working key is decrypted by using the first key of party A, to obtain the working key of party A. After obtaining the working key of each party, the FPGA chip can store the working key in the FPGA chip, and the working key is automatically erased when the FPGA hardware device is powered off, to ensure security. In addition, the working key can be periodically updated by periodically performing the previous key negotiation method, to ensure security. After all the at least one party negotiates a working key with the FPGA hardware device, the at least one party can sequentially encrypt the second configuration file by using the at least one working key of the at least one party, so that the FPGA chip can subsequently sequentially decrypt the encrypted file by using the at least one working key of the at least one party. It can be understood that here, a method for encrypting the second configuration file can be alternatively asymmetric encryption. In this case, the at least one party can sequentially encrypt the second configuration file by using at least one encryption key of the at least one party corresponding to the at least one working key.

In step S606, the second configuration file is stored in the first storage device. After decrypting the encrypted file to obtain the second configuration file, the FPGA chip can directly store the second configuration file in the first storage device, or as shown in FIG. 6, store the second configuration file in the DDR, and store the second configuration file from the DDR to the first storage device.

In an implementation, the encrypted file is an encrypted file obtained by packing and encrypting the second configuration file and the hash code value of the second configuration file. After decrypting the encrypted file as described above, the FPGA chip obtains the second configuration file and the hash value of the code of the second configuration file. The FPGA chip verifies the second configuration file by using the hash value of the code. After the verification succeeds, the FPGA chip stores the second configuration file in the first storage device.

In an implementation, the encrypted file further includes respective second keys of all the participants in the secure computing system. For example, the encrypted file is the encrypted file shown in FIG. 7. In this case, when the encrypted file is decrypted for the first time by using a working key of party C, a second key of party C is obtained, when the encrypted file is decrypted for the second time by using a working key of party B, a second key of party B is obtained, and when the encrypted file is decrypted for the third time by using a working key of party A, a second key of party A and the second configuration file are obtained. Then, the FPGA chip stores the second configuration file in the first storage device, and stores the respective second keys of party A, party B, and party C in the first storage device as updated first keys. It can be understood that the first key is not limited to being updated in the previous way. For example, according to the previous method for obtaining a working key, party A, party B, and party C separately perform key negotiation with the FPGA chip, to obtain second keys of all the parties from the FPGA hardware device, and the FPGA chip stores the second keys in the first storage device as updated first keys.

In an implementation, the FPGA hardware device further stores its own hardware key. For example, the fuse storage device further stores a hardware key. Before storing the previously obtained second keys in the first storage device, the FPGA chip further encrypts the second keys by using its own hardware key, and stores encrypted second keys in the first storage device, to improve security. When the FPGA chip needs to use the second keys, the FPGA chip reads the encrypted second keys from the first storage device, and decrypts the encrypted second keys by using its own hardware key, to obtain the second keys.

In step S608, the FPGA chip is reconfigured based on the second configuration file. That is, the FPGA chip is reprogrammed based on the second configuration file, so that the FPGA chip works based on the running logic in the second configuration file. For example, the second configuration file includes interface logic, updated bit file update logic, and updated data processing logic, to implement updating of the FPGA hardware device.

Figure 9:
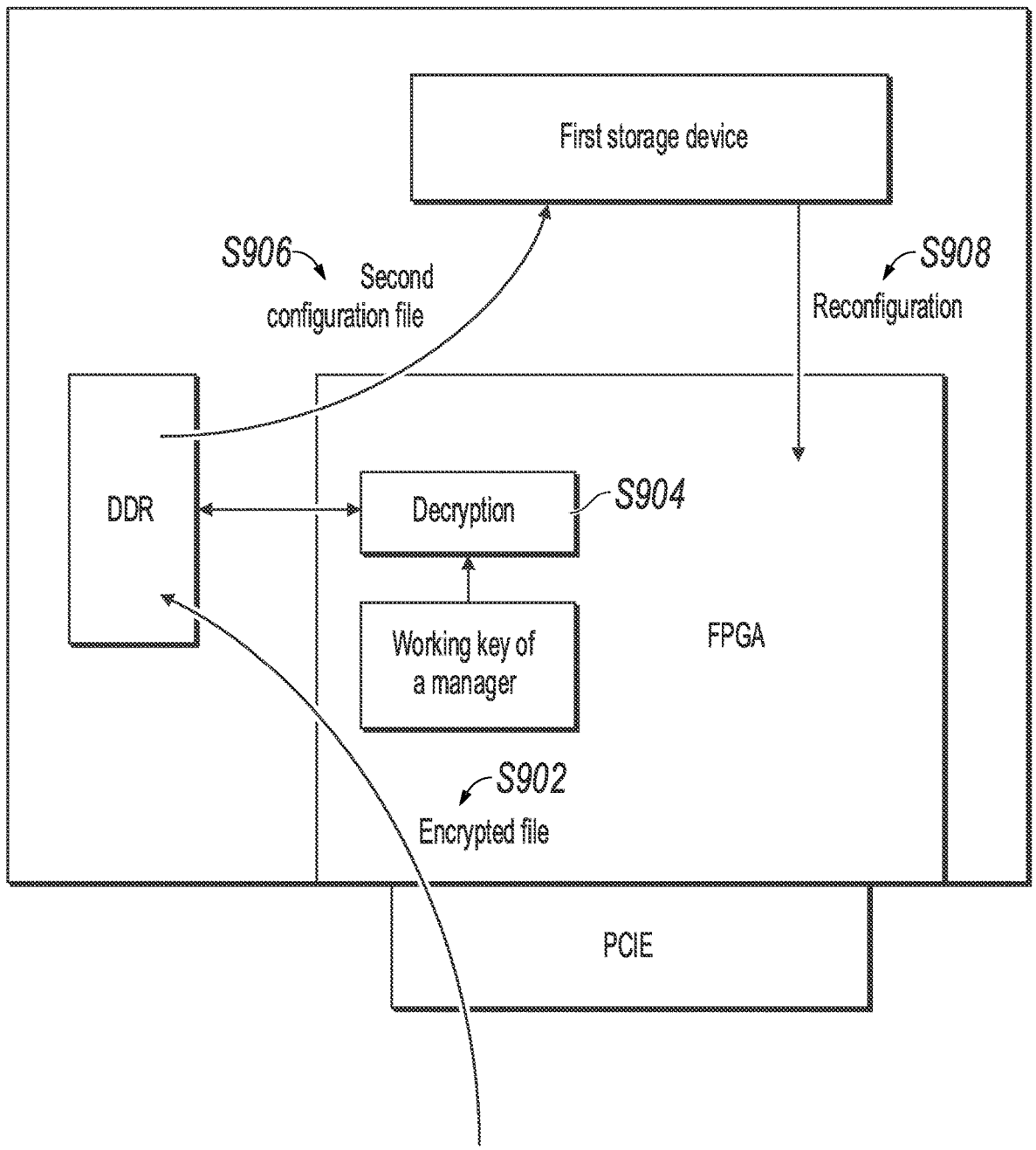
FIG. 9 is a schematic diagram illustrating a method for updating an FPGA hardware device used for secure computing, according to an implementation of the present specification.

FIG. 9 is a schematic diagram illustrating a method for updating an FPGA hardware device used for secure computing, according to an implementation of the present specification. The FPGA hardware device includes an FPGA chip and a first storage device connected to the FPGA chip, the first storage device is a nonvolatile storage device, the first storage device stores a first configuration file, the first configuration file includes first running logic jointly determined by a predetermined number of trusted managers in the secure computing system, the FPGA chip is currently configured based on the first configuration file, the FPGA hardware device stores at least one first key of the predetermined number of trusted managers, and the method is executed at the FPGA hardware device and includes the following steps.

In step S902, an encrypted file is obtained. The encrypted file is obtained by performing encryption in a first predetermined sequence by at least one manager in the predetermined number of trusted managers. An encryption object includes a second configuration file, and the second configuration file includes second running logic jointly determined by the predetermined number of trusted managers.

In step S904, the encrypted file is decrypted in a second predetermined sequence by using at least one working key of the at least one manager, to obtain the second configuration file. The second predetermined sequence corresponds to the first predetermined sequence, and the at least one working key of the at least one manager is obtained based on at least one first key of the at least one manager.

In step S906, the second configuration file is stored in the first storage device.

In step S908, the FPGA chip is reconfigured based on the second configuration file.

Specific implementation of the steps in the method shown in FIG. 9 is basically the same as the specific implementation of the steps in the method shown in FIG. 6. Differences lie in that the FPGA hardware device stores the first keys of all the managers, the first configuration file and the second configuration file are determined by all the managers, and the at least one manager in the predetermined number of managers sequentially encrypts the second configuration file during configuration file updating. Likewise, the second configuration file can be encrypted for the first time under joint surveillance of the other managers.

Similar to the method shown in FIG. 6, in the method shown in FIG. 9, the encrypted file can include second keys of all the managers, so that the built-in first keys of all the managers can be updated during configuration file updating. Except the previous differences, the specific implementation of the steps shown in FIG. 6 can be correspondingly applied to the steps shown in FIG. 9, and details are omitted here for simplicity.

Figure 10:
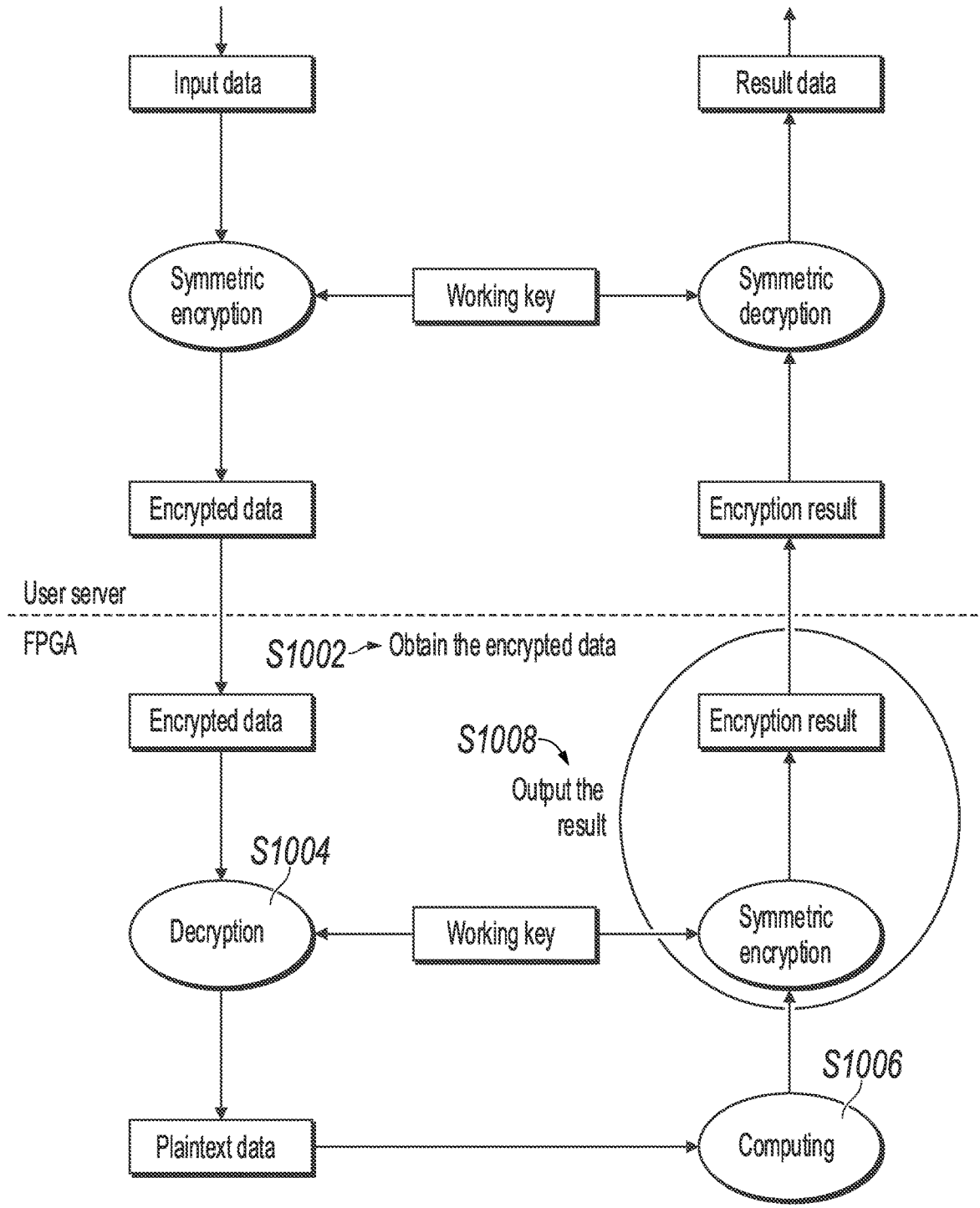
FIG. 10 is a schematic diagram illustrating a method for processing data based on an FPGA hardware device, according to an implementation of the present specification.

FIG. 10 is a schematic diagram illustrating a method for processing data based on an FPGA hardware device, according to an implementation of the present specification. In FIG. 10, an elliptical box is used to represent a method step, and a rectangular box is used to represent related data. The FPGA hardware device includes an FPGA chip used for secure computing, the FPGA chip is configured based on running logic jointly formulated by all participants in the secure computing system, and the hardware stores at least one first key of all the participants. For example, the FPGA hardware device is the FPGA hardware device obtained by using any method in FIG. 2, FIG. 3, or FIG. 6. The FPGA hardware device generated by using the method shown in FIG. 2, FIG. 3, or FIG. 6 constitutes a trusted execution environment (TEE), which can be used for secure computing. The method is executed at the FPGA hardware device.

As shown in FIG. 10, in step S1002, encrypted data of each participant is obtained. FIG. 10 further illustrates processing of a server of a party (for example, party A) in all participants on input data. For example, after party A negotiates a working key with the FPGA hardware device by using a first key of party A according to the method shown in FIG. 8, party A can first symmetrically encrypt input data of party A by using the working key, to obtain encrypted data, and input the encrypted data into the FPGA hardware device, for example, store the encrypted data in a DDR or the FPGA chip, by using the server. The working key can be the same as or different from the working key described above with reference to FIG. 6. Similarly, the working key can be stored in the FPGA chip, so that the working key is erased when the FPGA hardware device is powered off, or the working key can be periodically updated. In this case, the server invokes, for example, a data processing API in the FPGA hardware device, to input the encrypted data, so that the FPGA chip works based on logic corresponding to the data processing.

It can be understood that, in the previous description, although party A encrypts the input data by using the symmetric encryption method, this implementation of the present specification is not limited thereto. For example, party A can negotiate a pair of keys for asymmetric encryption with the FPGA hardware device by using the method shown in FIG. 8. For example, the pair of keys include a working key for decryption and a corresponding encryption key. In this case, party A can encrypt the input data of party A by using the encryption key, to obtain the encrypted data, and input the encrypted data into the FPGA hardware device by using the server.

In step S1004, the corresponding encrypted data is decrypted by using a working key of each participant, to obtain plaintext data of each party. For example, after obtaining the encrypted data of party A, the FPGA hardware device decrypts the encrypted data by using the working key of party A, to obtain plaintext data of party A. Similarly, the FPGA hardware device can obtain the plaintext data of each participant.

In step S1006, computing is performed based on the plaintext data of each party, to obtain a computing result. As described above, after the server invokes the data processing API, the FPGA chip works based on the logic corresponding to the data processing, and the logic includes logic corresponding to a computing model used to process data. Therefore, after obtaining the plaintext data of each party, the FPGA chip substitutes the plaintext data of each party into the corresponding computing model for computing, to obtain the computing result.

In step S1008, the computing result is output.

In an implementation, the computing result is not sensitive data and therefore does not need to be protected. In this case, the FPGA hardware device can directly output a plaintext computing result to a server, and send the computing result to each participant by using the server. For example, the FPGA hardware device can write the computing result to a corresponding address in the server by using a PCIE bus, to output the computing result to the server.

In an implementation, as shown in FIG. 10, after obtaining the computing result, the FPGA chip encrypts the computing result by using, for example, the working key of party A, to obtain an encryption result, and outputs the encryption result to the server, and the server sends the encryption result to party A. After obtaining the encryption result, party A can decrypt the encryption result by using the working key of party A, to obtain a plaintext computing result. The other participants in the secure computing system can similarly obtain plaintext computing results as party A.

In an implementation, input data is encrypted by using an asymmetric encryption method. For example, party A encrypts the input data by using the previous encryption key. In this case, the FPGA hardware device can obtain the encryption key from party A based on the first key of party A by using the key negotiation method shown in FIG. 8. Therefore, after obtaining the computing result, the FPGA chip encrypts the computing result by using the encryption key, to obtain an encryption result, and sends the encryption result to party A by using the server. After receiving the encryption result, party A can decrypt the encryption result by using the working key of party A, to obtain a plaintext computing result.

In an implementation, the working key is a first key of a corresponding party. During symmetric encryption, after obtaining the computing result, the FPGA chip encrypts the computing result by using, for example, the first key of party A, and outputs an encryption result to the server, so that the server sends the encryption result to party A. After obtaining the encryption result, party A can decrypt the encryption result by using the first key of party A, to obtain a plaintext computing result. The other parties can similarly obtain computing results as party A. During asymmetric encryption, each participant can build a corresponding first key and a corresponding second key in the FPGA hardware device when the FPGA hardware device is initialized, and update the first key and the second key during subsequent configuration file updating. The first key is a decryption key, and the second key is an encryption key. Therefore, after obtaining the computing result, the FPGA chip can encrypt the computing result by using the second key and output an encryption result.

Figure 11:
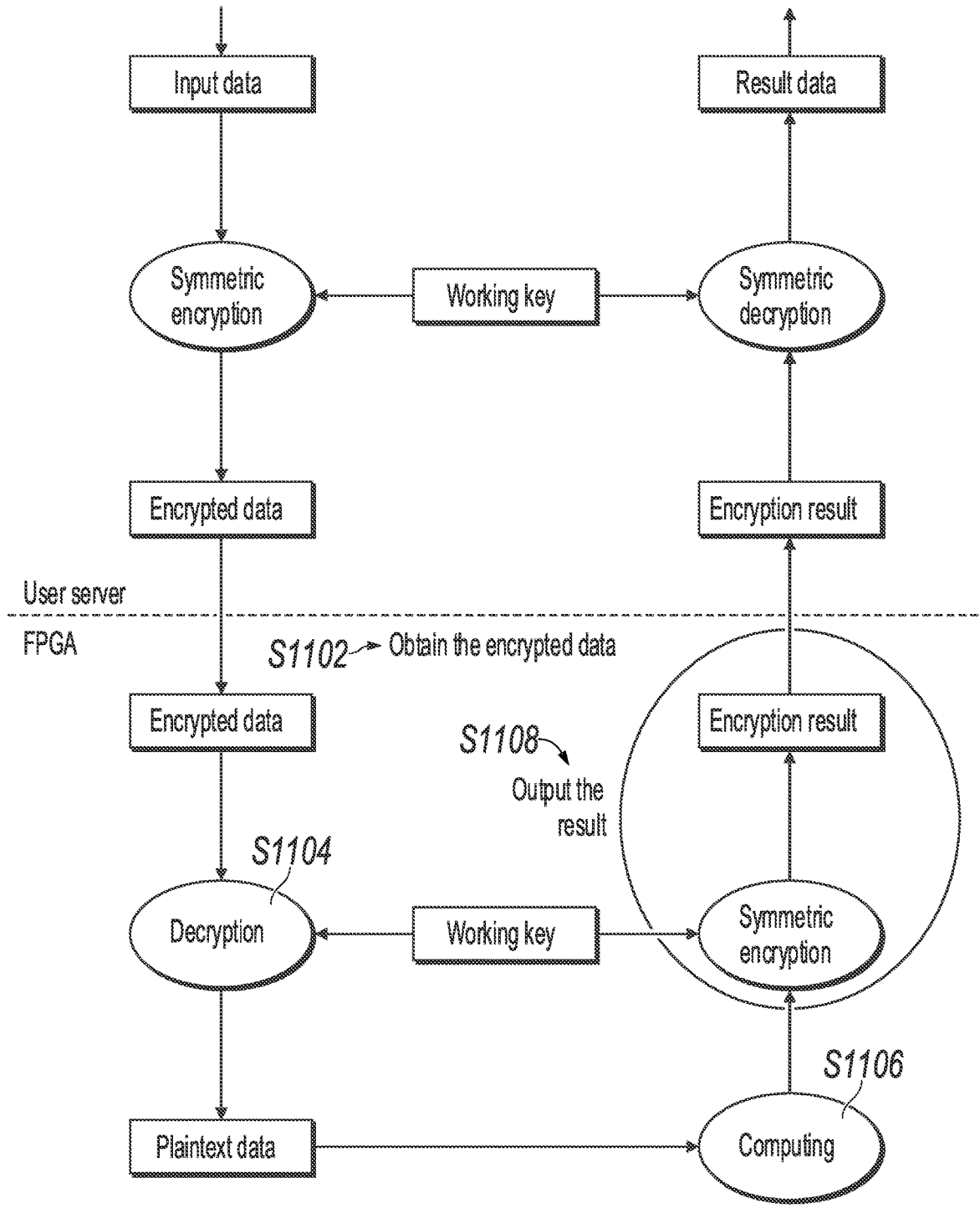
FIG. 11 is a schematic diagram illustrating a method for processing data based on an FPGA hardware device.

FIG. 11 is a schematic diagram illustrating a method for processing data based on an FPGA hardware device. The FPGA hardware device is used for secure computing and includes an FPGA chip, the FPGA chip is configured based on running logic jointly determined by a predetermined number of trusted managers in the secure computing system, and the FPGA hardware device stores at least one first key of the predetermined number of trusted managers. For example, the FPGA hardware device is the FPGA hardware device configured by using the method shown in FIG. 4, FIG. 5, or FIG. 9. The hardware constitutes a trusted execution environment (TEE) corresponding to all the trusted managers. The method is executed at the FPGA hardware device and includes the following steps.

In step S1102, encrypted data of each participant is obtained.

In step S1104, the corresponding encrypted data is decrypted by using a working key of each participant, to obtain plaintext data of each party, where the working key of each party is obtained based on a first key of a corresponding trusted manager.

In step S1106, computing is performed based on the plaintext data of each party, to obtain a computing result.

In step S1108, the computing result is output.

Different from the method shown in FIG. 10, in the method, the FPGA hardware device obtains a working key of a corresponding participant by negotiating a key with a corresponding trusted manager. For example, all participants include a first party, the predetermined number of trusted managers include a first manager, and the first party may choose to negotiate a key with the FPGA hardware device by using the first manager, that is, the first party corresponds to the first manager. Therefore, the first party provides a working key of the first party for the first manager, so that the first manager negotiates a key with the FPGA hardware device based on the following key negotiation process, and the FPGA hardware device internally obtains the working key of the first party. In addition, in the method, all the trusted managers can jointly monitor the data processing process, so that data and a computing result of each participant are not obtained by any one of the trusted managers. Similar to the method shown in FIG. 10, in the method, when the computing result is output, the computing result can be encrypted by using a working key of the participant, and the encryption can be symmetric encryption or asymmetric encryption. During asymmetric encryption, the FPGA hardware device similarly obtains an encryption key of the participant by using a first key of a corresponding manager.

In an implementation, all participants include a first party, the predetermined number of trusted managers include a first manager, the first party corresponds to the first manager, and the FPGA hardware device obtains a working key of the first party based on the following steps similar to the steps in FIG. 8: obtaining an encrypted working key of the first party, where the encrypted working key is generated after the first manager encrypts the working key of the first party by using a first key of the first manager, and the working key of the first party is received by the first manager from the first party, and decrypting the encrypted working key by using the first key of the first manager, to obtain the working key of the first party.

A key of a trusted manager is built in the FPGA hardware device, and the trusted manager provides a secure computing service for a user, so that the secure computing service can be provided for multiple groups of users by using the FPGA hardware device. In addition, the predetermined number of trusted managers jointly participate in and surveil the process of configuring the FPGA hardware device and the process of processing data by using the FPGA hardware device, to provide high security and reliability.

In an implementation, each manager can alternatively obtain a working key of the manager by using the key negotiation method shown in FIG. 8, and help each participant obtain a working key of the participant by using the working key of the manager.

Figure 12:
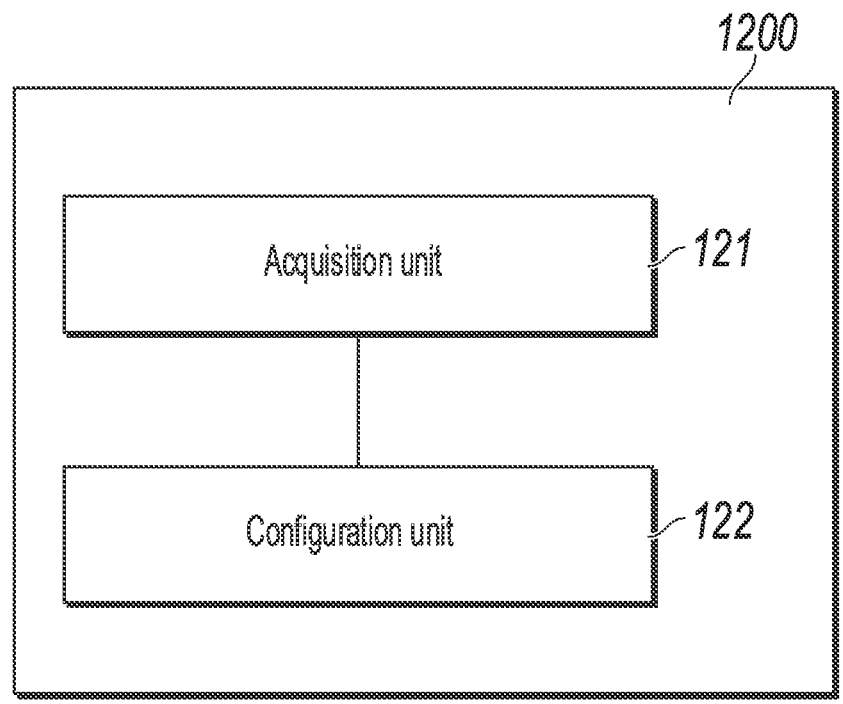
FIG. 12 illustrates apparatus 1200 for initializing an FPGA hardware device for secure computing, according to an implementation of the present specification.

FIG. 12 illustrates apparatus 1200 for initializing an FPGA hardware device for secure computing, according to an implementation of the present specification. The FPGA hardware device includes an FPGA chip and a first storage device connected to the FPGA chip, the first storage device is a nonvolatile storage device, the FPGA chip is configured based on a configuration file currently stored in the first storage device, and the apparatus is deployed at the FPGA hardware device and includes: acquisition unit 121, configured to obtain a first-version configuration file stored in the first storage device, where the first-version configuration file includes at least one initial key of all participants in the secure computing system, and the first-version configuration file includes predetermined running logic jointly formulated by all the participants, and configuration unit 122, configured to reconfigure the FPGA chip based on the first-version configuration file.

In an implementation, the FPGA hardware device is connected to a server by using a PCIE bus, and acquisition unit 121 is further configured to obtain the first-version configuration file that is written into the first storage device by the server by using the PCIE bus.

Figure 13:
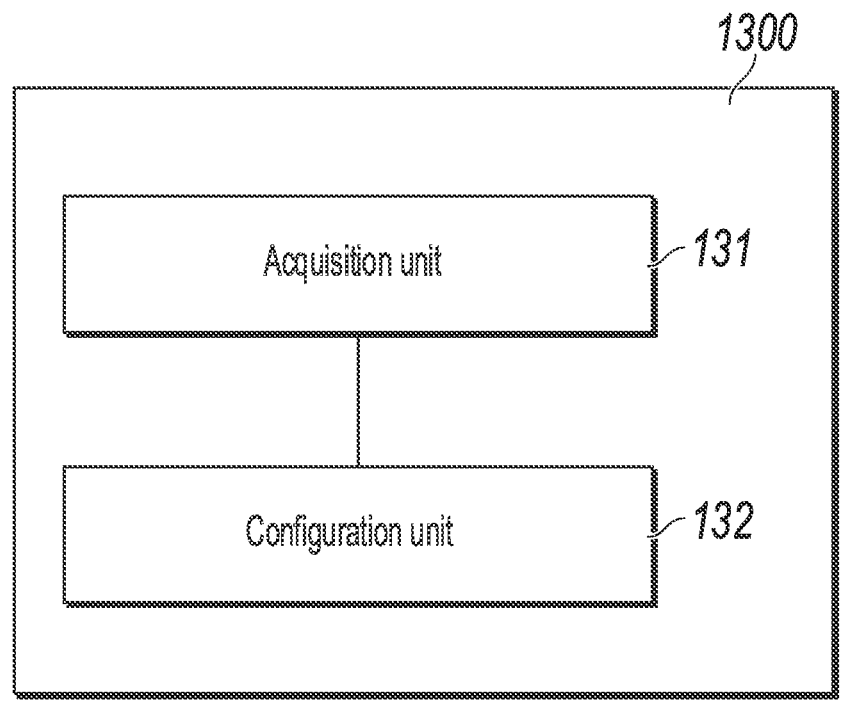
FIG. 13 illustrates apparatus 1300 for initializing an FPGA hardware device for secure computing, according to an implementation of the present specification.

FIG. 13 illustrates apparatus 1300 for initializing an FPGA hardware device for secure computing, according to an implementation of the present specification. The FPGA hardware device includes an FPGA chip and a first storage device connected to the FPGA chip, the first storage device is a nonvolatile storage device, the FPGA chip is configured based on a configuration file currently stored in the first storage device, the FPGA chip includes a fuse storage device, the fuse storage device pre-stores at least one first key of all participants in the secure computing system, and the apparatus is deployed at the FPGA hardware device and includes: acquisition unit 131, configured to obtain a first-version configuration file stored in the first storage device, where the first-version configuration file includes predetermined running logic jointly formulated by all the participants, and configuration unit 132, configured to reconfigure the FPGA chip based on the first-version configuration file.

Figure 14:
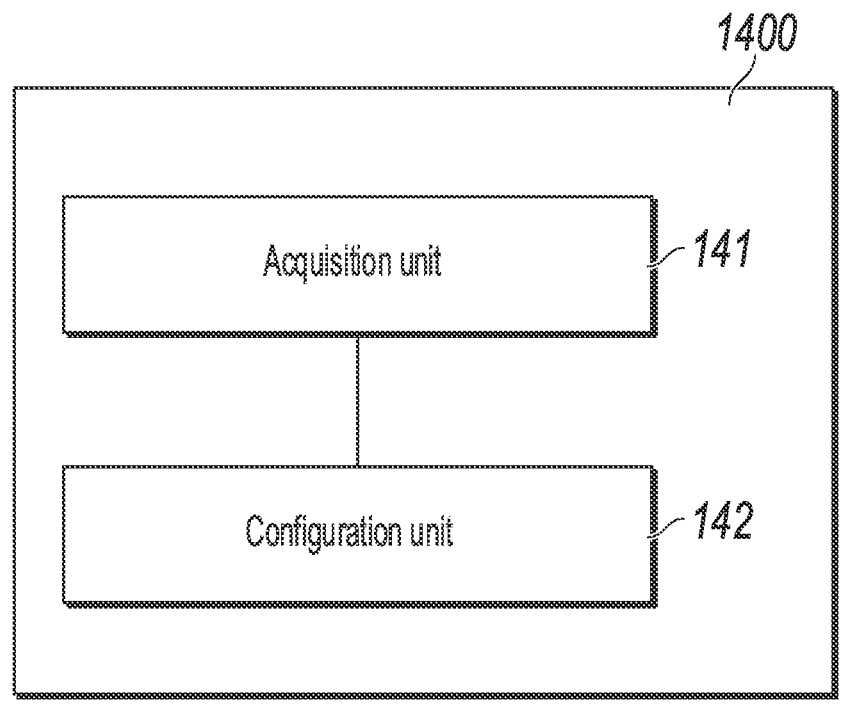
FIG. 14 illustrates apparatus 1400 for initializing an FPGA hardware device for secure computing, according to an implementation of the present specification.

FIG. 14 illustrates apparatus 1400 for initializing an FPGA hardware device for secure computing, according to an implementation of the present specification. The FPGA hardware device includes an FPGA chip and a first storage device connected to the FPGA chip, the first storage device is a nonvolatile storage device, the FPGA chip is configured based on a configuration file currently stored in the first storage device, and the apparatus is deployed at the FPGA hardware device and includes: acquisition unit 141, configured to obtain a first-version configuration file stored in the first storage device, where the first-version configuration file includes at least one initial key of a predetermined number of trusted managers in the secure computing system, and the first-version configuration file includes predetermined running logic jointly determined by all the managers, and configuration unit 142, configured to reconfigure the FPGA chip based on the first-version configuration file.

Figure 15:
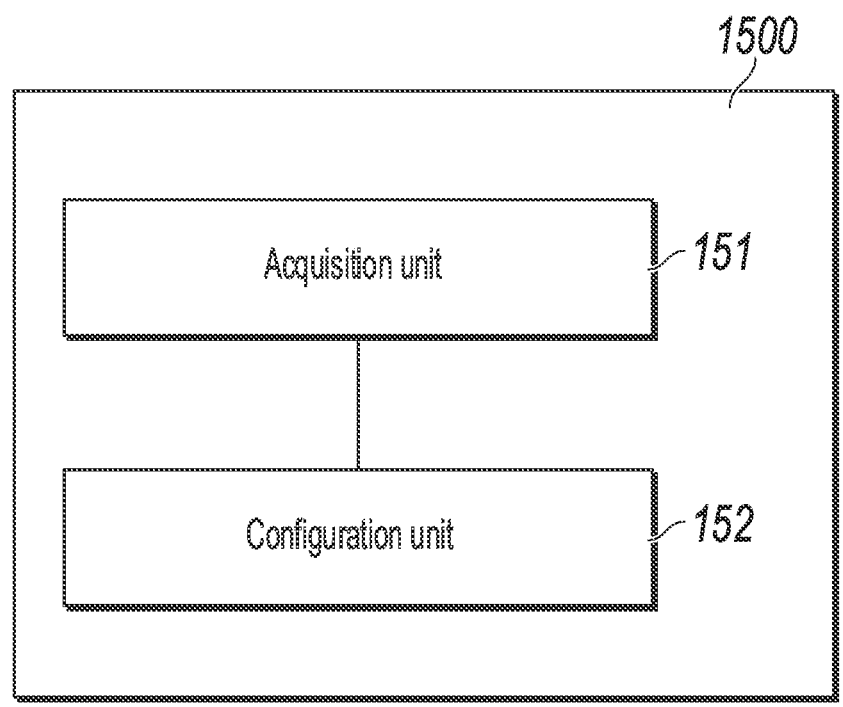
FIG. 15 illustrates apparatus 1500 for initializing an FPGA hardware device for secure computing, according to an implementation of the present specification.

FIG. 15 illustrates apparatus 1500 for initializing an FPGA hardware device for secure computing, according to an implementation of the present specification. The FPGA hardware device includes an FPGA chip and a first storage device connected to the FPGA chip, the first storage device is a nonvolatile storage device, the FPGA chip is configured based on a configuration file currently stored in the first storage device, the FPGA chip includes a fuse storage device, the fuse storage device pre-stores at least one first key of a predetermined number of trusted managers in the secure computing system, and the apparatus is deployed at the FPGA hardware device and includes: acquisition unit 151, configured to obtain a first-version configuration file stored in the first storage device, where the first-version configuration file includes predetermined running logic jointly determined by all the managers, and configuration unit 152, configured to reconfigure the FPGA chip based on the first-version configuration file.

Figure 16:
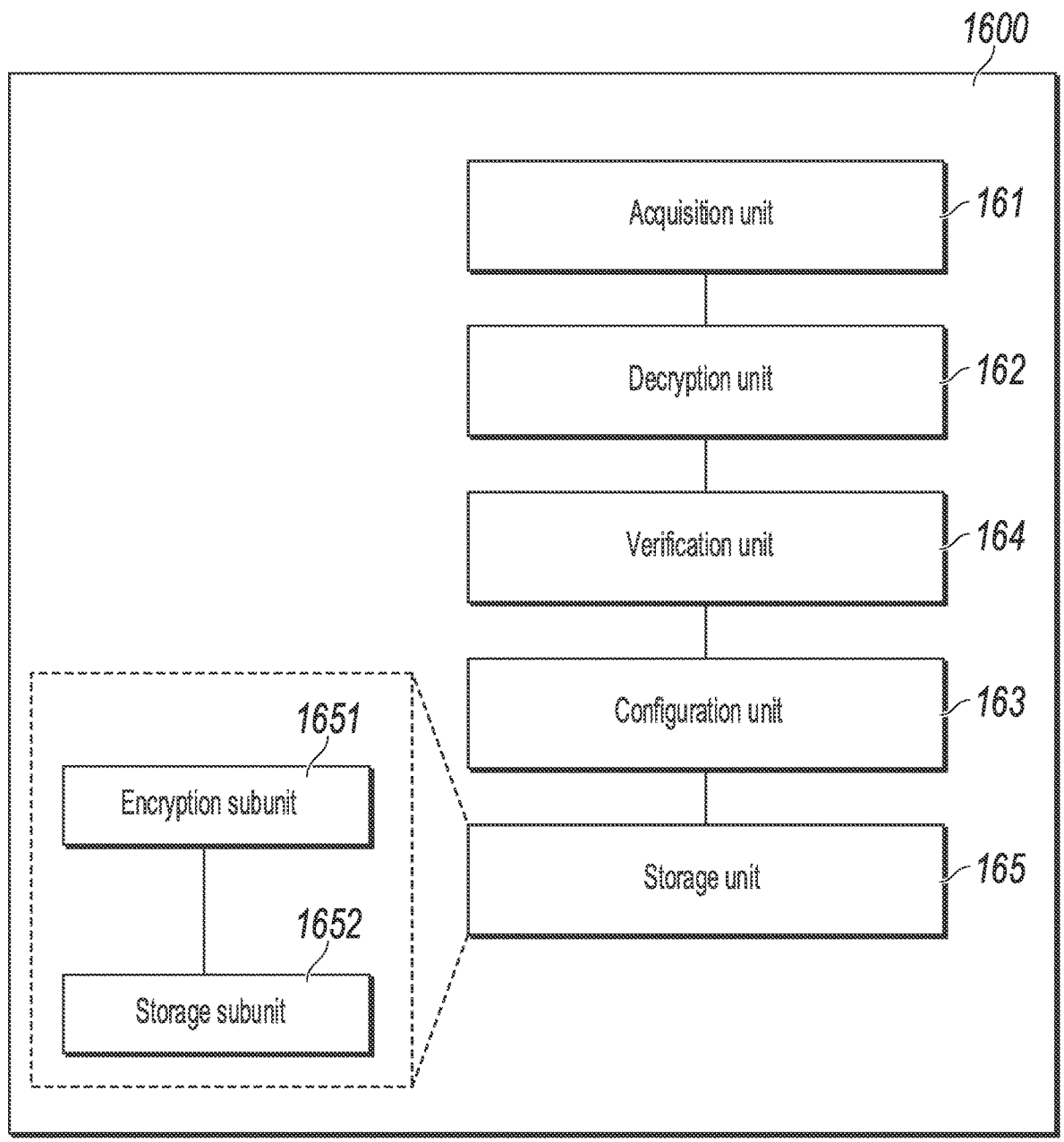
FIG. 16 illustrates apparatus 1600 for updating an FPGA hardware device used for secure computing, according to an implementation of the present specification.

FIG. 16 illustrates apparatus 1600 for updating an FPGA hardware device used for secure computing, according to an implementation of the present specification. The FPGA hardware device includes an FPGA chip and a first storage device connected to the FPGA chip, the first storage device is a nonvolatile storage device, the first storage device stores a first configuration file, the first configuration file includes first running logic jointly formulated by all participants in the secure computing system, the FPGA chip is currently configured based on the first configuration file, the FPGA hardware device stores at least one first key of all the participants, and the apparatus is deployed at the FPGA hardware device and includes: acquisition unit 161, configured to obtain an encrypted file, where the encrypted file is obtained by performing encryption in a first predetermined sequence by at least one party of all the participants, an encryption object of a first time of encryption includes a second configuration file, and the second configuration file includes second running logic jointly formulated by all the participants, decryption unit 162, configured to decrypt the encrypted file in a second predetermined sequence by using at least one working key of the at least one party, to obtain the second configuration file and store the second configuration file in the first storage device, where the second predetermined sequence corresponds to the first predetermined sequence, and the working key is obtained based on a first key of a corresponding party, and configuration unit 163, configured to reconfigure the FPGA chip based on the second configuration file.

In an implementation, the encryption object of the first time of encryption further includes a hash value of code of the second configuration file, decryption unit 162 is further configured to decrypt the encrypted file in the second predetermined sequence by using the at least one working key of the at least one party, to obtain the second configuration file and the hash value of the code of the second configuration file, and the apparatus further includes: verification unit 164, configured to verify the second configuration file by using the hash value of the code after the second configuration file and the hash value of the code of the second configuration file are obtained.

In an implementation, an encryption object of the encrypted file further includes respective second keys of all the participants, decryption unit 162 is further configured to decrypt the encrypted file in the second predetermined sequence by using the at least one working key of the at least one party, to obtain the second configuration file, and obtain a second key of a corresponding participant at each time of decryption, and the apparatus further includes: storage unit 165, configured to store the second key in the first storage device as an updated first key of the corresponding participant after the second key of the corresponding participant is obtained at each time of decryption.

In an implementation, the FPGA chip has its own hardware key, and storage unit 165 includes: encryption subunit 1651, configured to encrypt the second key by using the FPGA chip by using its own hardware key, and storage subunit 1652, configured to store an encrypted second key in the first storage device.

Figure 17:
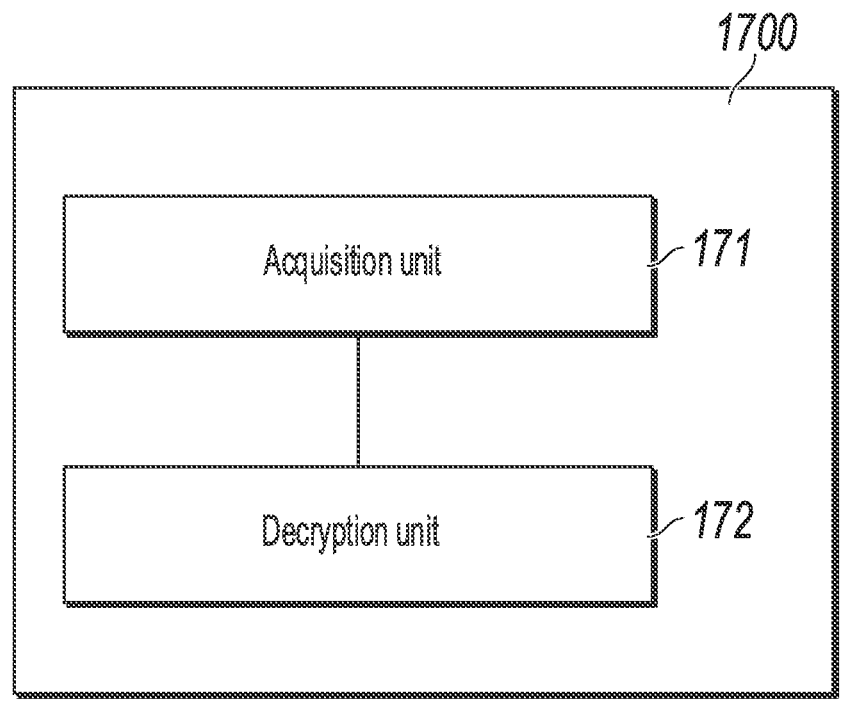
FIG. 17 illustrates key negotiation apparatus 1700, according to an implementation of the present specification.

In an implementation, all the participants include a first party, and the FPGA hardware device obtains a working key of the first party based on a key negotiation apparatus. FIG. 17 illustrates key negotiation apparatus 1700, according to an implementation of the present specification. Apparatus 1700 includes: acquisition unit 171, configured to obtain an encrypted working key of the first party, and decryption unit 172, configured to decrypt the encrypted working key by using a first key of the first party, to obtain the working key of the first party.

Figure 18:
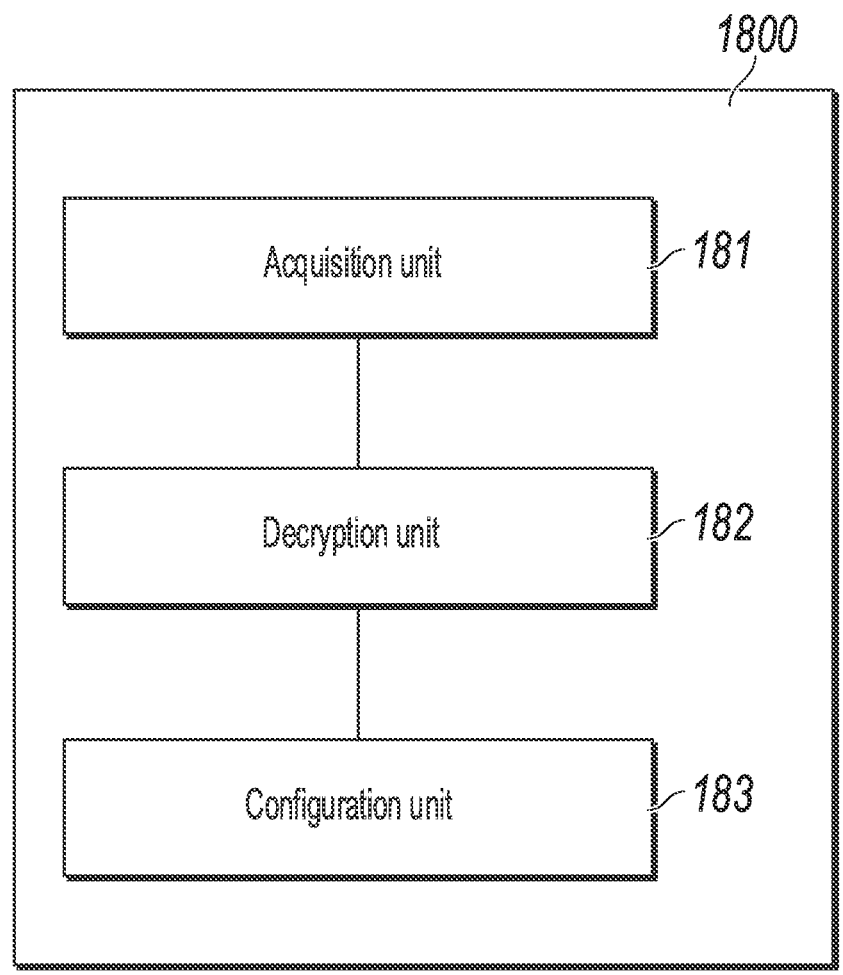
FIG. 18 illustrates apparatus 1800 for updating an FPGA hardware device used for secure computing, according to an implementation of the present specification.

FIG. 18 illustrates apparatus 1800 for updating an FPGA hardware device used for secure computing, according to an implementation of the present specification. The FPGA hardware device includes an FPGA chip and a first storage device connected to the FPGA chip, the first storage device is a nonvolatile storage device, the first storage device stores a first configuration file, the first configuration file includes first running logic jointly determined by a predetermined number of trusted managers in the secure computing system, the FPGA chip is currently configured based on the first configuration file, the FPGA hardware device stores at least one first key of the predetermined number of trusted managers, and the apparatus is deployed at the FPGA hardware device and includes: acquisition unit 181, configured to obtain an encrypted file, where the encrypted file is obtained by performing encryption in a first predetermined sequence by at least one manager in the predetermined number of trusted managers, an encryption object includes a second configuration file, and the second configuration file includes second running logic jointly determined by the predetermined number of trusted managers, decryption unit 182, configured to decrypt the encrypted file in a second predetermined sequence by using at least one working key of the at least one manager, to obtain the second configuration file and store the second configuration file in the first storage device, where the second predetermined sequence corresponds to the first predetermined sequence, and the at least one working key of the at least one manager is obtained based on at least one first key of the at least one manager, and configuration unit 183, configured to reconfigure the FPGA chip based on the second configuration file.

Figure 19:
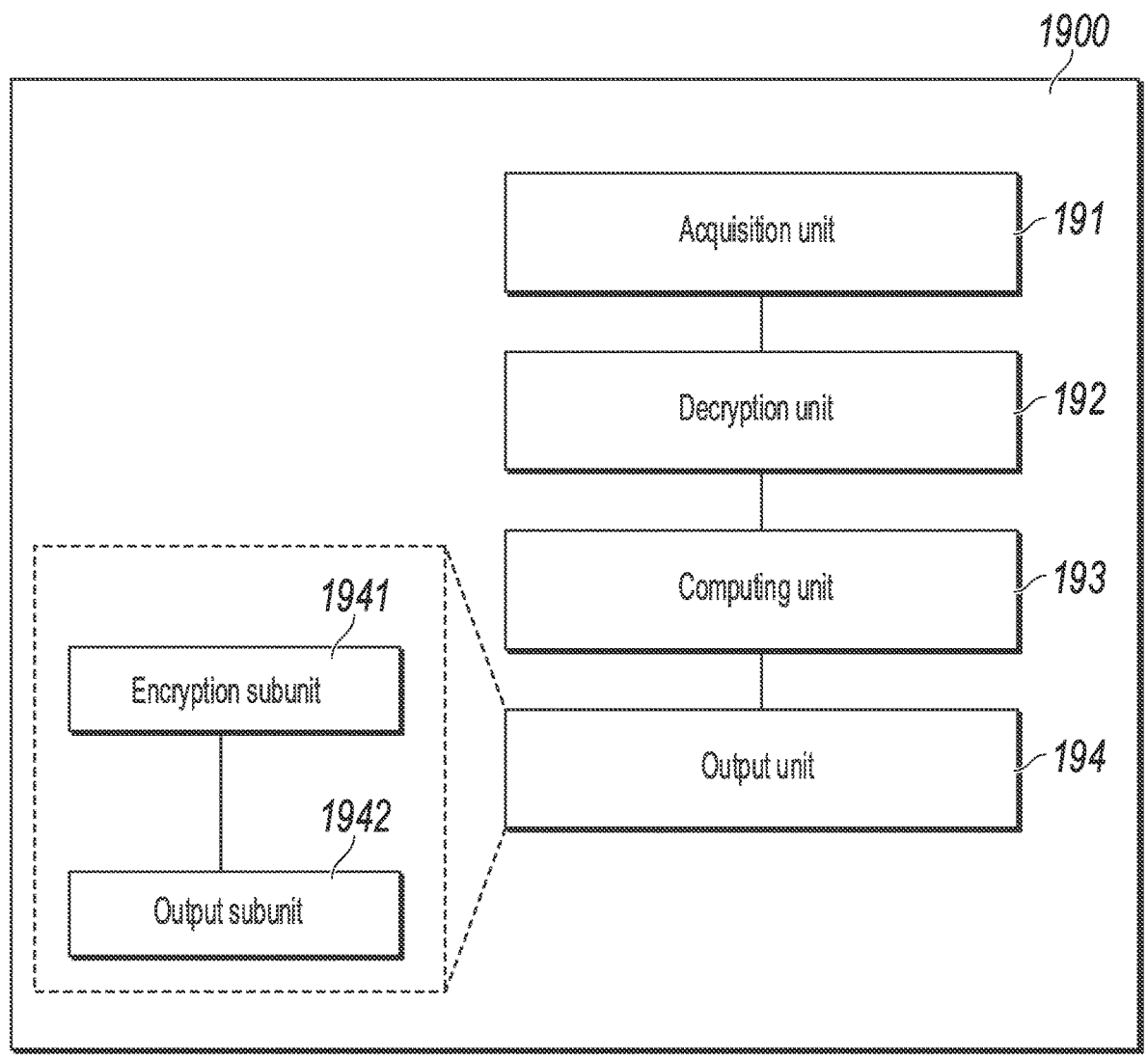
FIG. 19 illustrates apparatus 1900 for processing data based on an FPGA hardware device, according to an implementation of the present specification.

FIG. 19 illustrates apparatus 1900 for processing data based on an FPGA hardware device, according to an implementation of the present specification. The FPGA hardware device is used for secure computing and includes an FPGA chip, the FPGA chip is configured based on running logic jointly formulated by all participants in the secure computing system, the FPGA hardware device stores at least one first key of all the participants, and the apparatus is deployed at the FPGA hardware device and includes: acquisition unit 191, configured to obtain encrypted data of each participant, decrypting unit 192, configured to decrypt the corresponding encrypted data by using a corresponding working key of each participant, to obtain plaintext data of each party, where the corresponding working key is obtained based on a first key of a corresponding party, computing unit 193, configured to perform computing based on the plaintext data of each party to obtain a computing result, and output unit 194, configured to output the computing result.

In an implementation, the encrypted data is obtained through symmetric encryption, all the participants include a first party, and output unit 194 includes: encryption subunit 1941, configured to encrypt the computing result by using a working key of the first party, to obtain a first encryption result, and output subunit 1942, configured to output the first encryption result to the first party.

In an implementation, the encrypted data is obtained through asymmetric encryption, the working key is a decryption key of the asymmetric encryption, the asymmetric encryption further includes an encryption key corresponding to the working key, all the participants include a first party, an encryption key of the first party is obtained based on a first key of the first party, and output unit 194 includes: encryption subunit 1941, configured to encrypt the computing result by using the encryption key of the first party, to obtain a first encryption result, and output subunit 1942, configured to output the first encryption result to the first party.

In an implementation, the FPGA hardware device further stores respective second keys of all the participants, the encrypted data is obtained through asymmetric encryption, all the participants include a first party, a working key of the first party is a first key of the first party, a second key of the first party is an encryption key corresponding to the first key of the first party, and output unit 194 includes: encryption subunit 1941, configured to encrypt the computing result by using the second key of the first party, to obtain a first encryption result, and output subunit 1942, configured to output the first encryption result to the first party.

Figure 20:
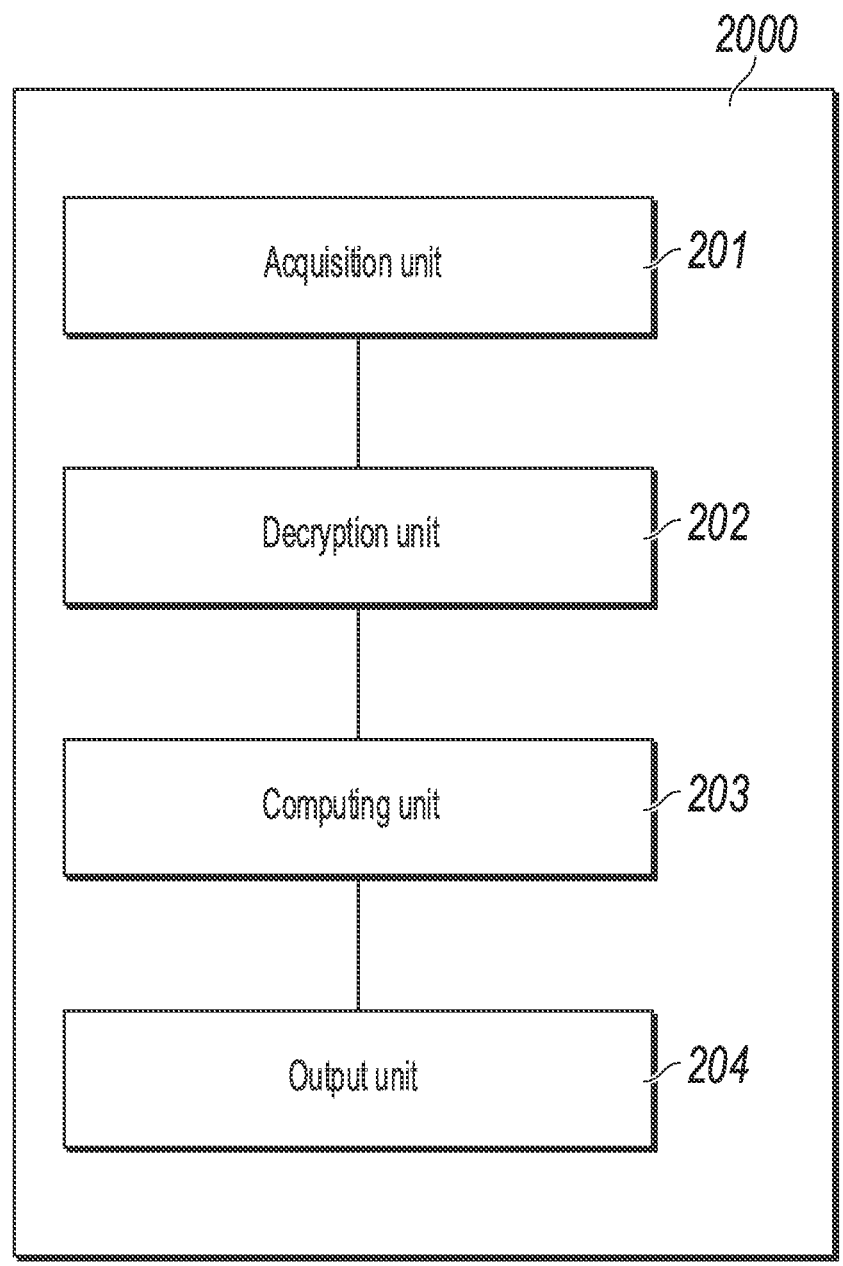
FIG. 20 illustrates apparatus 2000 for processing data based on an FPGA hardware device, according to an implementation of the present specification.

FIG. 20 illustrates apparatus 2000 for processing data based on an FPGA hardware device, according to an implementation of the present specification. The FPGA hardware is used for secure computing and includes an FPGA chip, the FPGA chip is configured based on running logic jointly determined by a predetermined number of trusted managers in the secure computing system, the FPGA hardware device stores at least one first key of the predetermined number of trusted managers, and the apparatus is deployed at the FPGA hardware device and includes: acquisition unit 201, configured to obtain encrypted data of each participant, decryption unit 202, configured to decrypt the corresponding encrypted data by using a working key of each participant, to obtain plaintext data of each party, where the working key of each party is obtained based on a first key of a corresponding trusted manager, computing unit 203, configured to perform computing based on the plaintext data of each party to obtain a computing result, and output unit 204, configured to output the computing result.

In an implementation, all participants include a first party, the predetermined number of trusted managers include a first manager, the FPGA hardware device obtains a working key of the first party by using a key negotiation apparatus similar to the key negotiation apparatus shown in FIG. 17, and the key negotiation apparatus includes: an acquisition unit, configured to obtain an encrypted working key of the first party, where the encrypted working key is generated after the first manager encrypts the working key of the first party by using a first key of the first manager, and the working key of the first party is received by the first manager from the first party, and a decryption unit, configured to decrypt the encrypted working key by using the first key of the first manager, to obtain the working key of the first party.

Another aspect of the present specification provides a computer readable storage medium, where the computer readable storage medium stores a computer program, and when the computer program is executed in a computer, the computer is enabled to perform any one of the previous methods.

Another aspect of the present specification provides a computing device, including a storage device and a processor, where the storage device stores executable code, and when executing the executable code, the processor implements any one of the previous methods.

According to the FPGA hardware-based secure computing solution in the implementations of the present specification, a secure computing environment is constructed by using FPGA hardware, so that user privacy cannot be stolen by hacker software. By using the FPGA hardware, all participants in the secure computing system can formulate running code, which provides higher security. By using the FPGA hardware, operation logic can be flexibly updated, so that various algorithms of users and algorithm update can be supported. A key is built in the FPGA hardware as a trust root, and the built-in key can be updated, so that security is improved. During FPGA hardware configuration, other than a first-version security bit file, all subsequent versions need to be encrypted by all parties, to alleviate a risk that the bit file is unilaterally tampered with. During FPGA hardware configuration, except that the first-version security bit file needs to be deployed by all the parties on the scene, all encryption versions can be remotely upgraded, thereby improving operation and maintenance convenience. A key is built in the FPGA hardware to negotiate a working key, and the working key needs to be renegotiated after the FPGA hardware is powered off, thereby further improving security. In addition, secure computing is performed by using the FPGA hardware, each participant encrypts input data of the participant, encrypted data is decrypted only in the FPGA hardware for plaintext computing, and an output result of the FPGA hardware can also be encrypted for output, so that the hardware is used to ensure that user data cannot be obtained by software on any server, thereby fully protecting user privacy.

The implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to some descriptions in the method implementation.

Specific implementations of the present application are described above. Other implementations fall within the scope of the appended claims. In some cases, the actions or steps described in the claims can be performed in a sequence different from the sequence in the implementation and the desired results can still be achieved. In addition, the process depicted in the accompanying drawing does not necessarily require a particular sequence to achieve the desired results. In some implementations, multi-tasking and parallel processing may be advantageous.

A person skilled in the art can be further aware that, in combination with the examples described in the implementations disclosed in the present specification, units and algorithm steps can be implemented by electronic hardware, computer software, or a combination thereof. To clearly describe interchangeability between hardware and software, compositions and steps of each example are described above based on functions. Whether the functions are performed by hardware or software depends on particular applications and design constraint conditions of the technical solutions. A person skilled in the art can use different methods to implement the described functions for each particular application, but it should not be considered that the implementation goes beyond the scope of the present application.

Steps of methods or algorithms described in the implementations disclosed in the present specification can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The previously described specific implementations further describe the objective, technical solutions, and benefits of the present application in detail. It should be understood that the precious descriptions are merely specific implementations of the present application, but are not intended to limit the protection scope of the present application. Any modification, equivalent replacement, improvement, etc. made without departing from the spirit and principle of the present application should fall within the protection scope of the present application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A method for processing data based on FPGA hardware, comprising:
obtaining, at an FPGA hardware device, encrypted data of each participant of a secure computing system, wherein the FPGA hardware device stores a plurality of immutable first keys, wherein the plurality of immutable first keys are a plurality of immutable first keys of all participants in the secure computing system, wherein the FPGA hardware device comprises an FPGA chip, wherein the FPGA chip is configured based on running logic jointly determined by two or more participants to prevent tampering of the configuration of the FPGA chip, wherein each particular immutable first key of the plurality of immutable first keys is not disclosed to any participant other than a participant that provides the particular immutable first key;

decrypting, at the FPGA hardware device, the encrypted data of each participant by using a dynamic working key of each participant, to obtain plaintext data of each participant, wherein the dynamic working key of each participant is obtained based on a corresponding immutable first key of the plurality of immutable first keys;

performing, at the FPGA hardware device, computing based on the plaintext data of each participant to obtain a computing result; and outputting, at the FPGA hardware device, the computing result.

2. The method according to claim 1, wherein the encrypted data of each participant is obtained through symmetric encryption, wherein all of the participants comprise a first party, and wherein outputting the computing result comprises:

encrypting the computing result by using a dynamic working key of the first party, to obtain a first encryption result; and outputting the first encryption result to the first party.

3. The method according to claim 1, wherein the encrypted data of each participant is obtained through asymmetric encryption, wherein the dynamic working key is a decryption key of the asymmetric encryption, wherein the asymmetric encryption further comprises an encryption key corresponding to the dynamic working key, wherein all of the participants comprise a first party, wherein an encryption key of the first party is obtained based on an immutable first key corresponding to the first party, and wherein outputting the computing result comprises:

encrypting the computing result by using the encryption key of the first party, to obtain a first encryption result; and outputting the first encryption result to the first party.

4. The method according to claim 1, wherein all of the participants comprise a first party, and wherein the FPGA hardware device obtains a dynamic working key of the first party based on the following steps:

obtaining an encrypted working key of the first party, wherein the encrypted working key is generated by encrypting the dynamic working key of the first party by using an immutable first key of the first party; and decrypting the encrypted working key by using the immutable first key of the first party, to obtain the dynamic working key of the first party.

5. The method according to claim 1, wherein the FPGA hardware device further comprises a first storage device connected to the FPGA chip, wherein the first storage device is a nonvolatile storage device, wherein the FPGA chip is configured based on a configuration file currently stored in the first storage device, and wherein the method further comprises:

obtaining a first configuration file stored in the first storage device, wherein the first configuration file comprises the plurality of immutable first keys and the running logic jointly determined by the two or more participants; and reconfiguring the FPGA chip based on the first configuration file.

6. The method according to claim 5, wherein the first configuration file is generated and provided under joint surveillance of the two or more participants at a location of the FPGA hardware device.

7. The method according to claim 5, further comprising:

obtaining an encrypted file, wherein the encrypted file is obtained by performing encryption in a first predetermined sequence by at least one party of the two or more participants, wherein the encrypted file comprises a second configuration file, and wherein the second configuration file comprises second running logic jointly determined by the two or more participants;

decrypting the encrypted file in a second predetermined sequence by using at least one dynamic working key of the at least one party, to obtain the second configuration file;

storing the second configuration file in the first storage device, wherein the second predetermined sequence corresponds to the first predetermined sequence; and reconfiguring the FPGA chip based on the second configuration file.

8. A non-transitory, computer-readable medium storing one or more instructions executable by a computer system to perform operations comprising:

obtaining, at an FPGA hardware device, encrypted data of each participant of a secure computing system, wherein the FPGA hardware device stores a plurality of immutable first keys, wherein the plurality of immutable first keys are a plurality of immutable first keys of all participants in the secure computing system, wherein the FPGA hardware device comprises an FPGA chip, wherein the FPGA chip is configured based on running logic jointly determined by two or more participants to prevent tampering of the configuration of the FPGA chip, wherein each particular immutable first key of the plurality of immutable first keys is not disclosed to any participant other than a participant that provides the particular immutable first key;

decrypting, at the FPGA hardware device, the encrypted data of each participant by using a dynamic working key of each participant, to obtain plaintext data of each participant, wherein the dynamic working key of each participant is obtained based on a corresponding immutable first key of the plurality of immutable first keys;

performing, at the FPGA hardware device, computing based on the plaintext data of each participant to obtain a computing result; and outputting, at the FPGA hardware device, the computing result.

9. The non-transitory, computer-readable medium according to claim 8, wherein the encrypted data of each participant is obtained through symmetric encryption, wherein all of the participants comprise a first party, and wherein outputting the computing result comprises:

encrypting the computing result by using a dynamic working key of the first party, to obtain a first encryption result; and outputting the first encryption result to the first party.

10. The non-transitory, computer-readable medium according to claim 8, wherein the encrypted data of each participant is obtained through asymmetric encryption, wherein the dynamic working key is a decryption key of the asymmetric encryption, wherein the asymmetric encryption further comprises an encryption key corresponding to the dynamic working key, wherein all of the participants comprise a first party, wherein an encryption key of the first party is obtained based on an immutable first key corresponding to the first party, and wherein outputting the computing result comprises:

encrypting the computing result by using the encryption key of the first party, to obtain a first encryption result; and outputting the first encryption result to the first party.

11. The non-transitory, computer-readable medium according to claim 8, wherein all of the participates comprise a first party, and wherein the FPGA hardware device obtains a dynamic working key of the first party based on the following steps:
- obtaining an encrypted working key of the first party, wherein the encrypted working key is generated by encrypting the dynamic working an immutable first key of the first party; and
- decrypting the encrypted working key by using the immutable first key of the first party, to obtain the dynamic working key of the first party.

12. The non-transitory, computer-readable medium according to claim 8, wherein the FPGA hardware device further comprises a first storage device connected to the FPGA chip, wherein the first storage device is a nonvolatile storage device, wherein the FPGA chip is configured based on a configuration file currently stored in the first storage device, and wherein the operations further comprise:
- obtaining a first configuration file stored in the first storage device, wherein the first configuration file comprises the plurality of immutable first keys and the running logic jointly determined by the two or more participants; and
- reconfiguring the FPGA chip based on the first configuration file.

13. The non-transitory, computer-readable medium according to claim 12, wherein the first configuration file is generated and provided under joint surveillance of the two or more participants at a location of the FPGA hardware device.

14. The non-transitory, computer-readable medium according to claim 12, further comprising:
- obtaining an encrypted file, wherein the encrypted file is obtained by performing encryption in a first predetermined sequence by at least one party of the two or more participants, wherein the encrypted file comprises a second configuration file, and wherein the second configuration file comprises second running logic jointly determined by the two or more participants;
- decrypting the encrypted file in a second predetermined sequence by using at least one dynamic working key of the at least one party, to obtain the second configuration file;
- storing the second configuration file in the first storage device, wherein the second predetermined sequence corresponds to the first predetermined sequence; and
- reconfiguring the FPGA chip based on the second configuration file.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
- obtaining, at an FPGA hardware device, encrypted data of each participant of a secure computing system, wherein the FPGA hardware device stores a plurality of immutable first keys, wherein the plurality of immutable first keys are a plurality of immutable first keys of all participants in the secure computing system, wherein the FPGA hardware device comprises an FPGA chip, wherein the FPGA chip is configured based on running logic jointly determined by two or more participants to prevent tampering of the configuration of the FPGA chip, wherein each particular immutable first key of the plurality of immutable first keys is not disclosed to any participant other than a participant that provides the particular immutable first key;
- decrypting, at the FPGA hardware device, the encrypted data of each participant by using a dynamic working key of each participant, to obtain plaintext data of each participant, wherein the dynamic working key of each participant is obtained based on a corresponding immutable first key of the plurality of immutable first keys;
- performing, at the FPGA hardware device, computing based on the plaintext data of each participant to obtain a computing result; and
- outputting, at the FPGA hardware device, the computing result.

16. The computer-implemented system according to claim 15, wherein the encrypted data of each participant is obtained through symmetric encryption, wherein all of the participants comprise a first party, and wherein outputting the computing result comprises:
- encrypting the computing result by using a dynamic working key of the first party, to obtain a first encryption result; and
- outputting the first encryption result to the first party.

17. The computer-implemented system according to claim 15, wherein the encrypted data of each participant is obtained through asymmetric encryption, wherein the dynamic working key is a decryption key of the asymmetric encryption, wherein the asymmetric encryption further comprises an encryption key corresponding to the dynamic working key, wherein all of the participants comprise a first party, wherein an encryption key of the first party is obtained based on an immutable first key corresponding to the first party, and wherein outputting the computing result comprises:
- encrypting the computing result by using the encryption key of the first party, to obtain a first encryption result; and
- outputting the first encryption result to the first party.

18. The computer-implemented system according to claim 15, wherein all of the participants comprise a first party, and wherein the FPGA hardware device obtains a dynamic working key of the first party based on the following steps:
- obtaining an encrypted working key of the first party, wherein the encrypted working key is generated by encrypting the dynamic working key of the first party by using an immutable first key of the first party; and
- decrypting the encrypted working key by using the immutable first key of the first party, to obtain the dynamic working key of the first party.

19. The computer-implemented system according to claim 15, wherein the FPGA hardware device further comprises a first storage device connected to the FPGA chip, wherein the first storage device is a nonvolatile storage device, wherein the FPGA chip is configured based on a configuration file currently stored in the first storage device, and wherein the operations further comprise:
- obtaining a first configuration file stored in the first storage device, wherein the first configuration file comprises the plurality of immutable first keys and the running logic jointly determined by the two or more participants; and reconfiguring the FPGA chip based on the first configuration file.

20. The computer-implemented system according to claim 19, wherein the first configuration file is generated and provided under joint surveillance of two or more participants at a location of the FPGA hardware device.

* * * * *

UNITED STATES PATENT AND TRADEMARK OFFICE
CERTIFICATE OF CORRECTION

PATENT NO. : 10,929,571 B2  
APPLICATION NO. : 16/742441  
DATED : February 23, 2021  
INVENTOR(S) : Guozhen Pan et al.

Page 1 of 1

It is certified that error appears in the above-identified patent and that said Letters Patent is hereby corrected as shown below:

In the Claims

Column 33, Line 3, in Claim 11, delete "participates" and insert -- participants --, therefor.

Column 33, Line 9, in Claim 11, after "working" insert -- key of the first party by using --.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*